(12) United States Patent
Coenen et al.

(10) Patent No.: US 12,445,671 B2
(45) Date of Patent: Oct. 14, 2025

(54) TELEVISION USER INTERFACE

(71) Applicant: Sky CP Limited, Middlesex (GB)

(72) Inventors: Robert Coenen, London (GB); Anthony Davies, London (GB); Pawel Nowakowski, Middlesex (GB); Andrew Olson, Surrey (GB); Greg Fleming, London (GB); Lewis Peel, Middlesex (GB); Stuart Keeley, London (GB); Julien Heanley, Manchester (GB)

(73) Assignee: Sky CP Limited, Isleworth (GB)

( * ) Notice: Subject to any disclaimer, the term of this patent is extended or adjusted under 35 U.S.C. 154(b) by 0 days.

(21) Appl. No.: 17/020,045

(22) Filed: Sep. 14, 2020

(65) Prior Publication Data

US 2020/0413122 A1 Dec. 31, 2020

Related U.S. Application Data

(63) Continuation of application No. 16/240,035, filed on Jan. 4, 2019, which is a continuation of application
(Continued)

(30) Foreign Application Priority Data

May 9, 2014 (GB) ..................................... 1408258
Oct. 17, 2014 (GB) ..................................... 1418421

(51) Int. Cl.
*H04N 21/422* (2011.01)
*G06F 3/048* (2013.01)
(Continued)

(52) U.S. Cl.
CPC ....... *H04N 21/42224* (2013.01); *G06F 3/048* (2013.01); *H04N 21/4314* (2013.01); *H04N 21/47202* (2013.01); *H04N 21/4821* (2013.01)

(58) Field of Classification Search
CPC .. H04N 21/47; H04N 21/482; H04N 21/4316; H04N 21/4532; H04N 21/44222;
(Continued)

(56) References Cited

U.S. PATENT DOCUMENTS 5,694,151 A 12/1997 Johnston, Jr. et al.
5,696,533 A 12/1997 Montgomery
(Continued)

FOREIGN PATENT DOCUMENTS

CN 101807293 A 8/2010
DE 19510657 2/1996
(Continued)

OTHER PUBLICATIONS

Extended European Search Report for European Patent ApplicationNo. 18 21 1780.
(Continued)

*Primary Examiner* — Jason Salce
(74) *Attorney, Agent, or Firm* — KATTEN MUCHIN ROSENMAN LLP

(57) ABSTRACT

A user interface for a television display includes a remote control with a touch pad. The user controls movement of an indicator by means of gestures and/or other actions performed on the touch pad. The movement of the indicator may be constrained in a horizontal and/or vertical direction. Actions by the user on the touch pad below a predetermined magnitude may be prevented from causing movement of the indicator.

23 Claims, 18 Drawing Sheets

Related U.S. Application Data

No. 15/309,878, filed as application No. PCT/GB2015/051384 on May 11, 2015, now Pat. No. 10,298,993.

(51) Int. Cl.
*H04N 21/431* (2011.01)
*H04N 21/472* (2011.01)
*H04N 21/482* (2011.01)

(58) Field of Classification Search
CPC .......... H04N 21/4821; H04N 21/4622; H04N 21/812; H04N 21/42204
See application file for complete search history.

(56) References Cited

U.S. PATENT DOCUMENTS

| | | |
|---|---|---|
| 5,886,697 A | 3/1999 | Naughton et al. |
| 5,929,840 A | 7/1999 | Brewer |
| 5,990,862 A | 11/1999 | Lewis |
| 6,075,575 A | 6/2000 | Schein et al. |
| 6,412,110 B1 | 6/2002 | Schein |
| 6,481,011 B1 | 11/2002 | Lemmons |
| 6,857,128 B1 | 2/2005 | Borden, IV et al. |
| 8,854,323 B2 | 10/2014 | Harada et al. |
| 9,100,614 B2 | 8/2015 | Minnick et al. |
| 9,110,562 B1 | 8/2015 | Eldawy |
| 9,148,178 B2 | 9/2015 | Wu et al. |
| 9,767,681 B2 | 9/2017 | Hope et al. |
| 2001/0035860 A1 | 11/2001 | Segal et al. |
| 2002/0007485 A1* | 1/2002 | Rodriguez ......... H04N 7/17318 725/1 |
| 2002/0073424 A1* | 6/2002 | Ward, III ........... H04N 21/4438 725/42 |
| 2003/0005445 A1* | 1/2003 | Schein ................... H04N 5/782 725/51 |
| 2003/0020744 A1* | 1/2003 | Ellis ................... H04N 5/44543 715/723 |
| 2003/0023976 A1* | 1/2003 | Kamen ................. H04N 21/84 725/53 |
| 2003/0028885 A1* | 2/2003 | Wilcox .............. G06Q 30/0601 725/60 |
| 2003/0079227 A1 | 4/2003 | Knowles |
| 2003/0167467 A1* | 9/2003 | Allen ................. H04N 21/4312 709/224 |
| 2007/0143793 A1 | 6/2007 | Barrett et al. |
| 2007/0300256 A1* | 12/2007 | Coomer ................. H04N 21/47 725/39 |
| 2008/0127262 A1* | 5/2008 | Neufeld ............. H04N 21/4826 725/40 |
| 2009/0064012 A1 | 3/2009 | Tremblay |
| 2009/0153288 A1 | 6/2009 | Hope et al. |
| 2010/0115550 A1 | 5/2010 | Minnick et al. |
| 2010/0171878 A1 | 7/2010 | VanDuyn et al. |
| 2010/0231525 A1 | 9/2010 | Chen |
| 2010/0277337 A1 | 11/2010 | Brodersen et al. |
| 2010/0281434 A1 | 11/2010 | Schroder |
| 2011/0073382 A1 | 3/2011 | Miyazawa |
| 2012/0062796 A1 | 3/2012 | Roberts et al. |
| 2012/0092299 A1 | 4/2012 | Harada et al. |
| 2012/0139847 A1 | 6/2012 | Hunt |
| 2012/0157013 A1 | 6/2012 | Wu et al. |
| 2012/0278840 A1* | 11/2012 | Glennon ............. H04N 21/482 725/56 |
| 2012/0293456 A1* | 11/2012 | Ikeda ............... H04N 21/42224 345/174 |
| 2013/0118879 A1 | 5/2013 | Rothkopf et al. |
| 2013/0215021 A1 | 8/2013 | Morikawa et al. |
| 2014/0026166 A1 | 1/2014 | Jeong |
| 2014/0089851 A1* | 3/2014 | Wielgosz ......... H04N 21/42204 715/810 |
| 2014/0130116 A1 | 5/2014 | Krikorian |
| 2014/0204273 A1* | 7/2014 | Saijo ....................... H04N 21/47 348/565 |
| 2015/0020111 A1* | 1/2015 | Stallings ............ H04N 21/4126 725/52 |
| 2015/0172744 A1* | 6/2015 | Kim .................. H04N 21/43637 725/37 |
| 2015/0193138 A1 | 7/2015 | Relyea |
| 2015/0326909 A1 | 11/2015 | Eun |

FOREIGN PATENT DOCUMENTS

| | | |
|---|---|---|
| EP | 1196839 | 4/2002 |
| EP | 1703367 | 9/2006 |
| EP | 1759529 | 3/2007 |
| EP | 1870800 | 12/2007 |
| EP | 2056596 | 5/2009 |
| EP | 2084900 | 8/2009 |
| EP | 2087727 | 8/2009 |
| EP | 2151723 | 2/2010 |
| EP | 2207346 | 7/2010 |
| EP | 2223194 | 9/2010 |
| EP | 2273781 | 1/2011 |
| EP | 2273781 A1 | 1/2011 |
| EP | 2335414 | 6/2011 |
| EP | 2370883 | 10/2011 |
| EP | 2388991 | 11/2011 |
| EP | 2388993 | 11/2011 |
| EP | 2458856 | 5/2012 |
| EP | 2458856 A1 | 5/2012 |
| EP | 2513760 | 10/2012 |
| EP | 2564598 | 3/2013 |
| EP | 2569683 | 3/2013 |
| EP | 2569686 | 3/2013 |
| EP | 2609488 | 7/2013 |
| EP | 2613546 | 7/2013 |
| EP | 2613550 | 7/2013 |
| EP | 2643743 | 10/2013 |
| EP | 2687969 | 1/2014 |
| GB | 2319591 | 1/1998 |
| GB | 2455767 | 1/2008 |
| GB | 2460061 | 6/2008 |
| GB | 2460061 A | 11/2009 |
| GB | 2482206 | 10/2010 |
| JP | 2007264919 | 10/2007 |
| JP | 2009-90586 A | 4/2009 |
| JP | 2013003974 A | 1/2013 |
| KR | 20130091208 | 8/2013 |
| NO | 200902974 | 12/2008 |
| WO | 9637996 A1 | 11/1996 |
| WO | 9723997 A1 | 7/1997 |
| WO | 9856176 | 12/1998 |
| WO | 9966721 A2 | 12/1999 |
| WO | 0111865 A1 | 2/2001 |
| WO | 2003/043320 A2 | 5/2003 |
| WO | 06/125999 A1 | 11/2006 |
| WO | 200838875 | 4/2008 |
| WO | 2009050489 A2 | 4/2009 |
| WO | 2011/057076 A1 | 5/2011 |
| WO | 201157076 | 5/2011 |
| WO | 2012071334 A2 | 5/2012 |
| WO | 2013106527 | 7/2013 |
| WO | 2013/157013 A1 | 10/2013 |
| WO | 2013157013 | 10/2013 |
| WO | 2013/169877 A2 | 11/2013 |

OTHER PUBLICATIONS

Office Action for Chinese Patent Application No. 201580037173.3 with a mailing date of Dec. 5, 2018.
Final Rejection dated Jul. 24, 2020, from U.S. Appl. No. 16/240,035, 25 sheets.
Non-Final Rejection dated Jan. 3, 2020, from U.S. Appl. No. 16/240,035, 36 sheets.
Non-Final Rejection dated Aug. 3, 2018, from U.S. Appl. No. 15/309,878, 28 sheets.
Final Rejection dated Nov. 3, 2017, from U.S. Appl. No. 15/309,878, 25 sheets.
Non-Final Rejection dated Jul. 21, 2017, from U.S. Appl. No. 15/309,878, 25 sheets.

(56) References Cited

OTHER PUBLICATIONS

International Search Report and Written Opinion dated Oct. 27, 2015, from International Application No. PCT/GB2015/051384, 18 sheets.
Communication pursuant to Article 94(3) EPC, dated Mar. 18, 2021, from EP Application No. 15 728 079.3-1209, 8 sheets.
Summons to Oral Proceedings dated Aug. 16, 2022, from European Patent Application No. 15728079.3, 6 sheets.
Notice of Allowance dated Jul. 10, 2024, from U.S. Appl. No. 16/240,035, 22 sheets.
Corrected Notice of Allowability dated Jul. 26, 2024, from U.S. Appl. No. 16/240,035, 6 sheets.

* cited by examiner

TELEVISION USER INTERFACE

CROSS-REFERENCE TO RELATED APPLICATIONS

This application is a continuation of U.S. patent application Ser. No. 16/240,035, filed Jan. 4, 2019, which is a continuation of U.S. patent application Ser. No. 15/309,878, filed Nov. 9, 2016, now U.S. Pat. No. 10,298,993, issued May 21, 2019, which claims priority under 35 U.S.C. 371 to PCT/GB2015/051384 filed on May 11, 2015, which in turn claims priority to Great Britain Application Nos. 1408258.0, filed on May 9, 2014, and 1418421.2 filed on Oct. 17, 2014. The contents of each of these applications are incorporated by reference in their entirety for all purposes.

FIELD OF THE INVENTION

The present invention relates to user interfaces for television displays, and to apparatus, methods and computer programs for implementing such user interfaces, particularly but not exclusively using a remote control.

BACKGROUND OF THE INVENTION

Electronic programme guides (EPGs) provide a user interface for the display of television programmes, such as audio and video programmes, to the user. Interactive EPGs allow the user to select programmes for viewing and/or recording. Examples of known EPGs include those provided with the Sky® and Sky+™ set-top boxes. Aspects of those EPGs are described in WO-A-96/37996, WO-A-99/66721 and WO-A-2009/050489.

EPGs are typically designed for display on a television (TV) screen, and are therefore limited by the resolution of that screen. With the advent of High Definition TV (HDTV), higher resolution EPGs are possible. However, the number of different channels available continues to increase and the user must typically navigate around the EPG, or filter by search criteria, to find a programme of interest.

It is also desirable to include additional information in an EPG, such as programme notes, and to provide additional functionality, such as Push or Pull Video On Demand (VOD), interactive TV content and user configurable options and preferences, all incorporated within the EPG window.

With this increased amount of information for display, there is a need for an intuitive, easy to use means of navigating large quantities of television programming to find desired programmes. A remote control is typically used to navigate around the EPG and select programmes for viewing. Remote controls currently used for television systems typically comprise a handset including directional keys or buttons for navigation through a menu or EPG. With the advent of larger and more complex EPGs, excessive button pressing is required to select the desired programme or option. More recently, remote controls have been introduced with analog direction controls, such as touch pads and motion sensors; examples are disclosed in WO-A-2012/071334 (Hillcrest Laboratories) and U.S. Pat. No. 6,412,110. However, these analog direction controls are not well integrated with the EPG and do not provide intuitive control for the user. For example, the analog direction controls may control the position of a pointer on the display, but the user may find it difficult to control the position of the pointer and to select the required option.

STATEMENTS OF THE INVENTION

According to one aspect of the invention, there is provided a user interface for a television display, including a remote control with a touch pad. The user controls movement of one or more portions of the user interface by means of one or more gestures and/or other actions performed on the touch pad. The movement may be constrained in a horizontal and/or vertical direction. Actions by the user on the touch pad below a predetermined magnitude may be prevented from causing movement of the one or more portions of the user interface.

The one or more portions of the user interface may include a position indicator, relative movement of which is caused by said one or more gestures performed on the touch pad. The user interface may include a plurality of items, each selectable by moving the position indicator onto or towards the respective item.

The user interface may include discrete adjacent components having a boundary there between. Movement of the position indicator across the boundary and movement within a component may require discrete user actions on the remote control.

According to another aspect of the present invention, there is provided a remote control for a television system, the remote control having a touch pad arranged to output touch position information, and a tactile switch associated with the touch pad, such that a user actuation of the touch pad causes the tactile switch to close and touch position information to be output, the television being arranged to respond variably to closure of the tactile switch, depending on the associated touch position information. This arrangement may be used to define a plurality of virtual keys or buttons on the touch pad, which are actuated by touching a corresponding area of the touch pad so as to close the tactile switch.

According to another aspect of the present invention, there is provided a method of controlling a trick play mode in a television system by means of a touch-sensitive surface, wherein the direction and/or speed of playback is controlled by a touch gesture on the touch-sensitive surface.

According to another aspect of the present invention, there is provided a method of displaying an electronic programme guide (EPG) in a television system, in which a programme may be selected by the user from the displayed EPG and additional programme information relating to the programme is displayed in response to that selection, and the additional programme information is removed from the display during scrolling through the EPG. This may allow more rapid scrolling, and may allow a larger area of a display to be devoted to the EPG during scrolling.

According to another aspect of the present invention, there is provided a method of displaying an EPG, in which a filter menu is displayed vertically to one side of the EPG, and is hidden when a filter option is selected from that menu. The filter menu may be displayed alongside a vertical pane, and the filter menu is hidden by an animation which appears to show the filter menu being hidden behind the vertical pane. The selected filter option may be displayed on the vertical pane. Preferably, the vertical pane displays a live TV window and/or other video or still information.

According to another aspect of the present invention, there is provided a method of superimposing a programme banner over a displayed live video broadcast in a selected one of a plurality of channels, wherein the transparency of the programme banner is varied according to the selected channel. This overcomes visibility problems in superimposing banners over programmes likely to contain a high incidence of in-programme graphics, such as news and sports programmes. The programme banner may indicate current and future programmes on a selected channel.

According to another aspect of the present invention, there is provided a method of displaying video content windows corresponding to a plurality of currently tuned channels, together with one or more further windows representing suggested programmes and/or channels; these may be suggested on the basis on the programmes viewed in the currently tuned channels, and/or historical data.

Apparatus and/or a computer program arranged to perform any of the above aspects of the invention may be provided.

BRIEF DESCRIPTION OF THE DRAWINGS

There now follows, by way of example only, a detailed description of preferred embodiments of the present invention in which:

FIGS. 11a to 11d are screenshots of an EPG display.

DETAILED DESCRIPTION OF THE EMBODIMENTS

Television Display Apparatus

In this section, a satellite broadcast receiver is described as an example of apparatus on which a television display may be implemented. It is not intended as limiting to the scope of the invention. Other types of television display apparatus may include cable TV or Internet TV (IPTV) apparatus, and the receiver may include a plurality of different types of such apparatus. Additionally, the display apparatus may be any other audio/visual display apparatus, such as a personal computer, configured to receive and display television signals.

Figure 1:
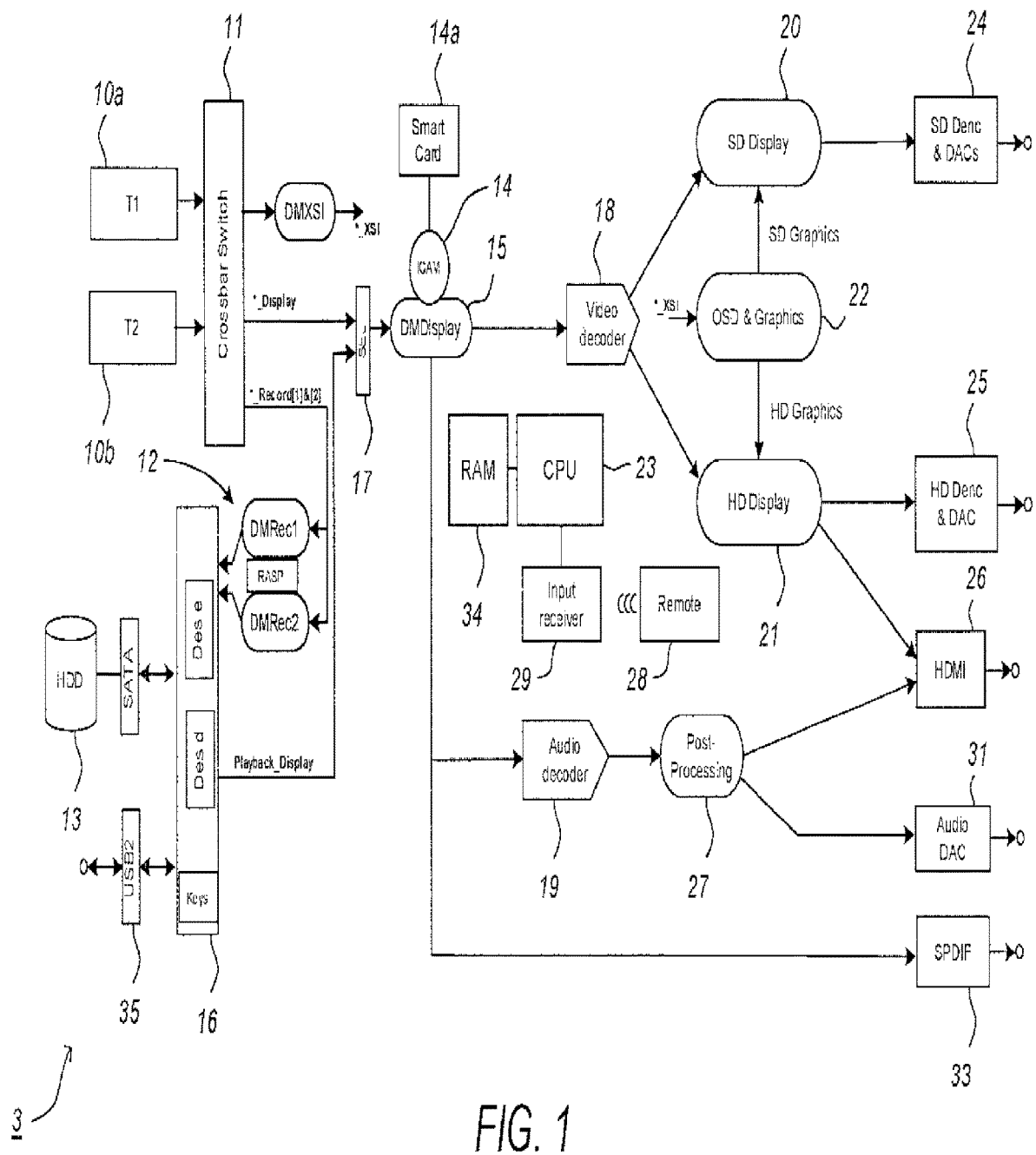
FIG. 1 is a block diagram of the functional components of a satellite broadcast receiver.

FIG. 1 shows a satellite broadcast receiver 3 for receiving television signals from a satellite television broadcast network. In this example, received signals are input to first and second tuners 10a and 10b but any number of tuners may be used in the receiver 3; for example, 8 or 16 different tuners may be provided. The received signals may comprise multiplexed channels. The tuners 10a and 10b are tuneable into the same or different channels of the satellite television broadcast network for simultaneous reception of the same or different television programmes. Signals from the tuners 10a and 10b are passed to a crossbar switch 11 which separates the data received from the tuners 10a and 10b into data for direct output to a television, data representing received television programmes for recording and subsequent playback, and user services and programme scheduling data, in accordance with the XSI standard, for example. The receiver 3 has a hard disk (or other memory medium) 13 which receives from the crossbar switch 11 compressed video and audio data for recording and subsequent playback via recording and playback circuitry 16. In the embodiment illustrated in FIG. 1, the receiver 3 includes two demultiplexer recording pipes (DMRec1 and DMRec2), which are coupled to Random Access Streaming Protocol circuitry (RASP) for analysing data in a received stream and indexing the data as it is received, but there may be more than two such pipes. The recording and playback circuitry 16 is also configured to perform decryption of received data, for example before the video and audio data is transmitted for playback on a display, using stored decryption keys according to the encryption technique used to encrypt the received data.

The received signals comprise digitally encoded data. In this example, the data is compressed using the Digital Video Broadcast/Moving Pictures Expert Group 2 or 4 (DVB/MPEG 2/4) standard which permits both programme data and additional data (for example interactive service data) to be transmitted in a single channel. DVB/MPEG 2/4 enables high compression ratios to be achieved. The hard disk 13 receives and stores compressed data. The data is decompressed only after retrieval from the hard disk 13.

Satellite (and indeed cable) programmes are usually scrambled to prevent unauthorised access by non-authorised subscribers. The receiver 3 therefore has an Integrated Conditional Access Module (ICAM) 14 which co-operates with a smart card 14a to determine whether the viewer has subscribed to a particular channel and is therefore authorised to access the channel. Parental control over channel access is also provided, at least in part, by the access control circuit 14. The receiver 3 further comprises a demultiplexing and descrambling circuit 15 which receives from a selector 17 data from the crossbar switch 11 for direct output or data from the hard disk 13 for playback. The demultiplexing and descrambling circuit 15 separates the data into video data and audio data for distribution to various locations within the receiver 3. The demultiplexing and descrambling circuit 15 is also controlled by the access control circuit 14 to enable the descrambling of the signal by authorised subscribers. The receiver 3 also comprises a video decoder 18 for decompression and processing of encoded video data received from the demultiplexing and descrambling circuit 15, and an audio decoder 19 for decompression and processing of compressed audio data, operating according to the MPEG 2/4 or H.264/H.265 standards, for example.

Decompressed video data is supplied to standard definition display circuitry 20 and high definition display circuitry 21 which combines the decompressed video data with corresponding standard definition or high definition on-screen display and graphics generated by on-screen display and graphics generation circuitry 22 using the user services and programme scheduling data. The standard definition display circuitry 20 provides the combined standard definition video and graphics data to a standard definition digital encoder and Digital to Analogue Converters (DACs) 24 where the data is encoded and converted into an appropriate format for direct input to a television set. The high definition display circuitry 21 supplies the combined high definition video and graphics data to a high definition digital encoder and Digital to Analogue Converter (DAC) 25 where the data is encoded into an appropriate high definition format for output to a high definition TV if so desired. The combined high definition video and graphics data is also supplied to a High Definition Multimedia Interface (HDMI) interface 26 which also receives decompressed audio data from the audio decoder 19 via audio post-processing circuitry 27, for output to an HDMI input of a high definition TV if so desired. Decompressed and processed audio data is also supplied to an audio DAC 31 for direct input to an analogue audio device or speakers. The demultiplexing and descrambling circuit 15 also outputs compressed digital audio to a proprietary audio interface, for example in accordance with the Sony/Philips Digital Interconnect Format (SPDIF) 33 for direct input to appropriate audio equipment.

The receiver 3 is controlled by a processor 23 which communicates with the various units of the receiver via a bus (not shown). The processor 23 has associated with it Random Access Memory (RAM) 34. The processor 23 controls operation of the receiver 3 by tuning the tuners 10a and 10b to receive signals for the desired channels by controlling the demultiplexing, descrambling and decompression so that the desired programme and/or interactive service data is displayed on the screen of the TV, and by controlling the hard disk 13 to record desired television programmes or to play back previously recorded television programmes. Viewer selection of desired programmes and customer services is controlled by viewer manipulation of a RCU 28, which in response to such viewer manipulation transmits control signals to an RCU interface 29 for input to the processor 23. The RCU interface 29 may include a Bluetooth® interface and/or an infrared (IR) interface for communication with an RCU 28, as described below.

The RCU 28 also allows the viewer to control of the operation of the hard disk 13 to record television programmes, to play back recorded television programmes and to program the recording of television programmes, etc.

Operation of the receiver 3 is controlled by software and/or firmware that makes the processor 23 responsive to control signals from the RCU 28 and/or additional data in the received signals. Interaction between hardware and software in the receiver 3 may be as described in detail in the Applicant's earlier international patent application published as WO 01/11865. Operation of the receiver 3 in receiving and decoding data representing television programmes and data defining scheduling and other information related to the programmes may be substantially as described in detail in the Applicant's earlier international patent application published as WO 96/37996. Operation of the receiver 3 in providing interactive services may be substantially as described in the Applicant's earlier international patent application published as WO 97/23997.

Within the Digital Video Broadcasting (DVB) standard for digital television broadcast there exists a standard for the transmission of schedule information such that it can be decoded and presented correctly to subscribers in the form of an Electronic Programme Guide (EPG). This DVB standard is known generally as the SI standard and can be found in the specification: ETS 300 468, ETSI Digital Broadcasting Systems for Television, Sound and Data Services; Specification for Service Information (SI) in Digital Video Broadcasting (DVB) Systems 2nd edition. Guidelines for using the specification are given in ETSI ETR 211-DVB SI Guidelines. The receiver 3 is designed to support the SI specification.

In addition to operating data for use in controlling access to channels, additional data in a channel can include brief programme schedule data representative of so-called event information tables (EITs) defining the scheduling of programmes in each channel. The programme schedule data is stored in the RAM 34 and, once stored, the scheduling information is available effectively instantaneously. Alternatively, the programme schedule data may be stored in the hard disk 13. The programme schedule data is transmitted regularly so that the receiver 3 will be updated substantially continuously. As those skilled in the art will appreciate, the transmitted information may be brief to enable each channel to carry a reduced set of programme schedule data without excessive overheads in terms of bandwidth requirements in each channel and memory requirements in the receiver.

In addition, a dedicated EPG channel transmits more detailed programme scheduling information, such as programme synopsis or other ancillary data associated with the scheduled programmes, which is stored in the hard disk 13. The information transmitted via this dedicated channel is updated more frequently and covers a longer period of time (e.g. two weeks). As a consequence, an up-to-date television programme schedule of a complete week should always be available. As explained in greater detail below, the receiver 3 is arranged to display the programme scheduling information for several of the channels over a predetermined period of time on the TV. Also, a viewer can interact with the receiver 3 to program recordings of television programmes, view a desired part of the available programme schedule, etc., on the basis of the information received via the dedicated EPG channel.

Since the tuners 10a and 10b can be tuned to receive different channels, it is possible for a first television programme in one channel to be displayed on a TV and recorded on the hard disk 13, while at the same time a second television programme in another channel is also recorded on the hard disk 13. Operation of the receiver 3 in providing simultaneous recording and playback may be substantially as described in the Applicant's earlier international patent application published as WO 01/11865.

The hard disk 13 of the receiver 3 is similar to conventional hard disks used in computer systems for storing large amounts of data. The hard disk 13 has a capacity of many gigabytes to a few terabytes (e.g. 500 gigabytes or 1 terabyte) and receives video and audio data via a SATA interface, for example, for storage in the compressed form in which it is received, for example, in accordance with the DVB/MPEG 2/4/H.264/5 standards as discussed above. This allows for the storage of several hours of television programmes (e.g. 100+ hours) on the hard disk 13. The hard disk 13 comprises two storage areas, one for the storage of television programme data, and the other for storing metadata which is used to control the hard disk 13, for example as discussed in greater detail in the Applicant's earlier patent publications mentioned above. The processor 23 controls the operation of the hard disk 13. More specifically, the processor 23 controls the recording and playback of television programmes to and from the hard disk 13. Other processors (not shown) can be used to control the hard disk 13 as appropriate, but the control is described in this document with reference to only processor 23 to facilitate understanding.

The receiver 3 also includes one or more external interfaces 35, such as a Universal Serial Bus 2 (USB2) port. The USB2 interface may be connected to a transcoding device (not shown) via a USB connector, which allows media content in a first format to be supplied from the receiver 3 and transcoded by the connected transcoding device into a second media coding format suitable for playback on a Personal Media Player (not shown). Operation of the receiver 3 in providing transcoding services may be substantially as described in the Applicant's earlier international patent application published as WO 06/125999.

Remote Control Unit (RCU)

Figure 2:
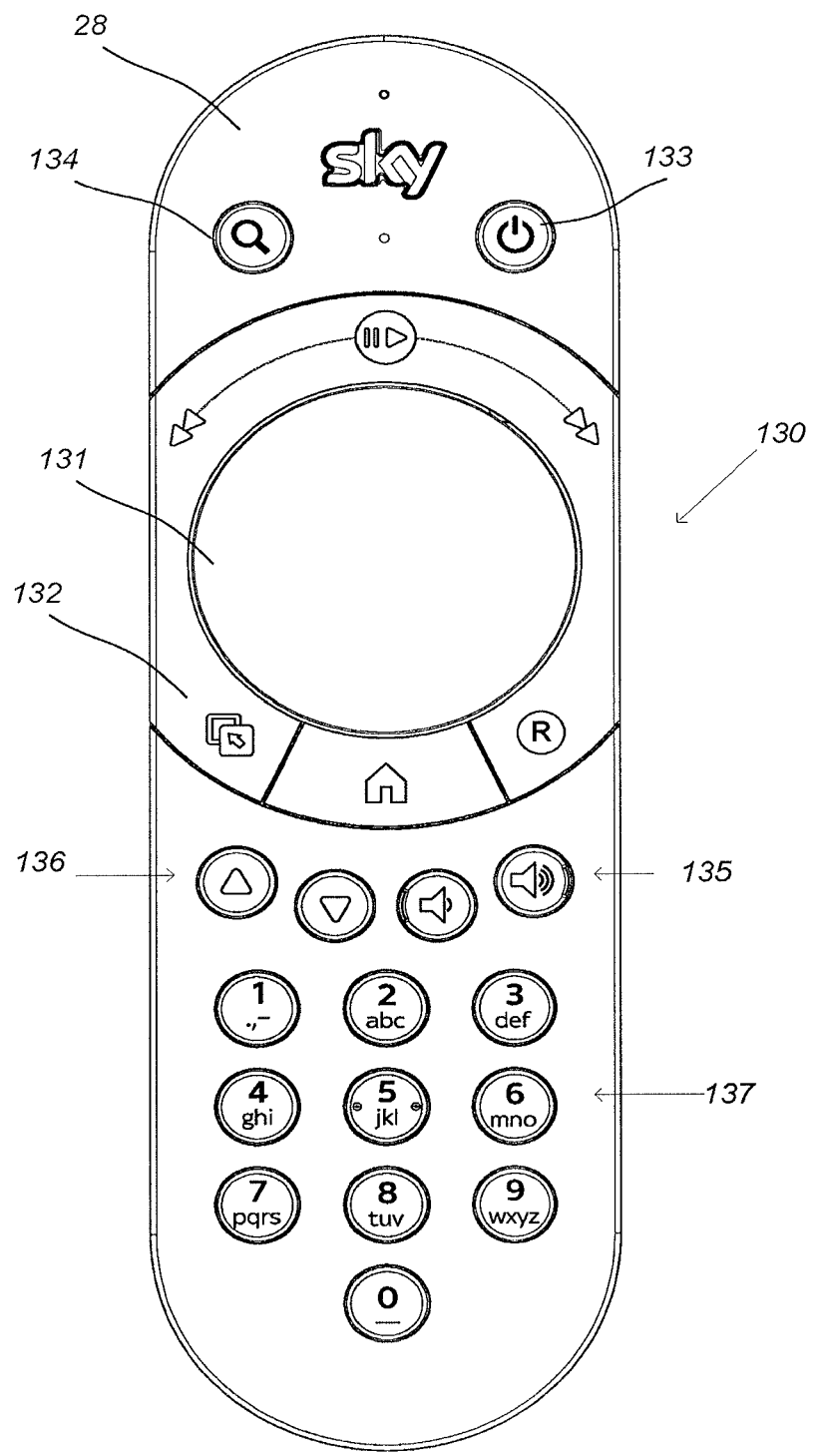
FIG. 2 is a schematic illustration of a remote control unit (RCU) for use with embodiments of the present invention.

As will be described in the embodiments below, a user navigates between particular display areas, programmes and menu items of an interactive user interface using one or more analog direction controls and/or appropriate button or key presses of a RCU 28. FIG. 2 shows an example of the front face of a RCU 28 for use with embodiments of the present invention. As shown in FIG. 2, the RCU 28 includes a capacitive touch pad 130 having a circular inner area 131 and an annular outer area 132. Markings may be provided on the inner area 131 and/or outer area 132, to indicate 'virtual' buttons or areas corresponding to specific functions, as will be described in more detail below.

The inner area 131 and outer area 132 may comprise physically discrete touch-sensitive areas, for example having separate outputs, or may comprise virtual areas of a single physical touch-sensitive area. In this embodiment, the inner area 131 comprises a discrete touch pad having one or more tactile or 'tact' switches coupled thereto, so that pressing the inner area 131 closes the tactile switch(es), preferably with tactile feedback to the user. In other words, the user may 'click' the touch pad of the inner area 131. Different tact switches may be closed by pressing different areas of the inner area 131, or a single tact switch may be closed by pressing any portion of the inner area 131. The latter may be preferable in that it does not require tilting of the touch pad of the inner area 131, which is mechanically complex and may lead to sticking.

The outer area 132 may include discrete sections coupled to tactile switches, which correspond to specific buttons, such as back-up button 123, home button 124 and record button 125. One or more other sections may be touch sensitive but not coupled to any tactile switches, such as the upper section of the outer area 132 as shown in FIG. 2. In this case, virtual buttons in the upper section are marked, for ease of identification by the user. The operation of such virtual buttons is determined by an RCU interface in the receiver 3, as described below.

The remote control 28 may also have physical buttons (i.e. keys or buttons defined in the hardware of the remote), separate from the capacitive touch pad 130. Examples in this embodiment include a power on/off button 133, search button 134, volume up/down buttons 135, channel up/down buttons 136 and numeric keys 137. Other configurations of physical buttons may be provided. Optionally, the capacitive touch pad may be replaced by discrete physical buttons, for example for cost reasons. However, the capacitive touch pad, or other analog direction control, may be required for some of the embodiments described below.

RCU to UI Interface

Figure 3:
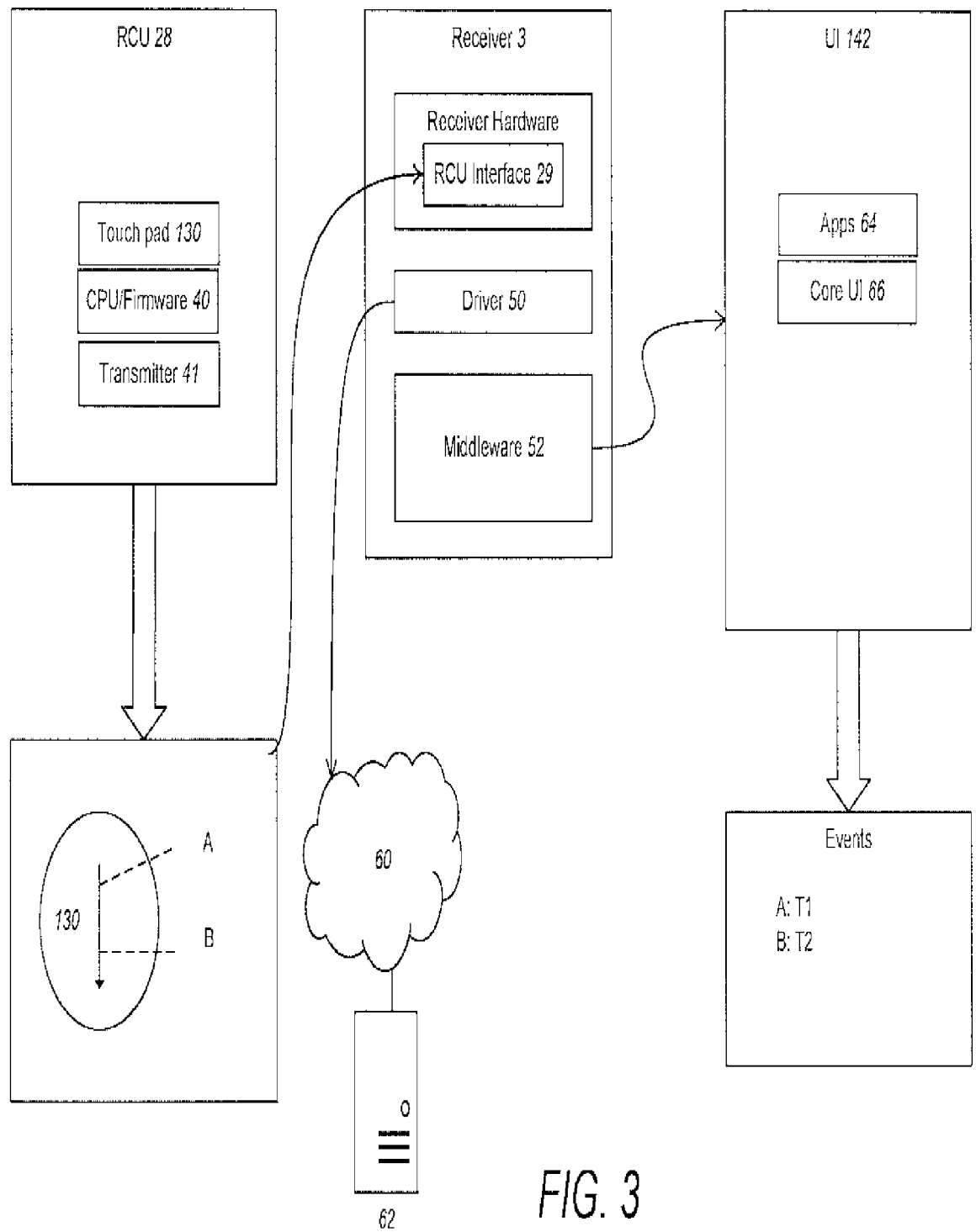
FIG. 3 is a schematic diagram of the RCU to UI interface in an embodiment of the invention.

FIG. 3 illustrates schematically the interface between the RCU 28 and the UI 142. The RCU 28 includes a CPU and firmware 40 and a transmitter 41 for communication with the RCU interface 29 using infra-red (IR) signals and/or short-range wireless link signals such as Bluetooth® signals, which allow higher bandwidth bi-directional communication. The RCU 28 may include a microphone (not shown) for receiving voice commands from the user; these are encoded as audio signals and sent over the wireless link to the receiver 3. Voice recognition is performed on the audio signals to interpret the commands; the voice recognition may be performed at the receiver 3 or by a remote server 62 connected to the receiver 3 over a network 60, such as the Internet.

The RCU 28 detects the absolute X and Y coordinates of the touch position on the areas 131 and 132 as discrete touch events and sends these to the RCU interface 29 periodically (e.g. at 100 Hz).

The RCU 28 also outputs, to the RCU interface 29, signals indicating pressing of the tactile switches and physical buttons.

The signals received by the RCU interface 29 are converted by an RCU driver 50 at the receiver 3 into user interface commands for output to user interface (UI) components 142, via middleware 52. The UI components 142 include a core UI layer 66, for example Qt (TM) and an app layer 64, for example Luna. The touch events A, B are time-stamped with the times T1, T2 at which they were received by the UI components 142.

The method of conversion of signals by the driver 50 depends on the type of input from the RCU 28. For example, a press of a physical button on the RCU 28 is converted into a corresponding user interface command. However, the outputs from the touch pad 130 require more complex conversions, as described below.

Figure 4:
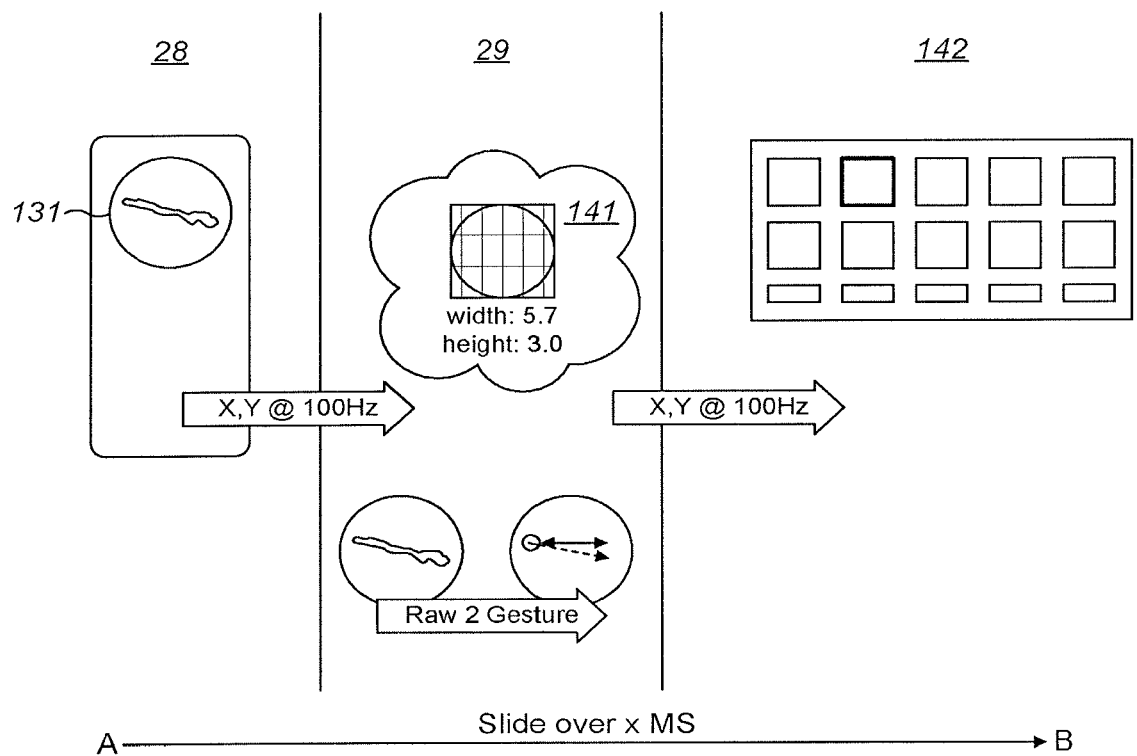
FIGS. 4 and 5 are schematic diagrams illustrating the operation of an RCU interface in an embodiment of the invention.
Figure 5:
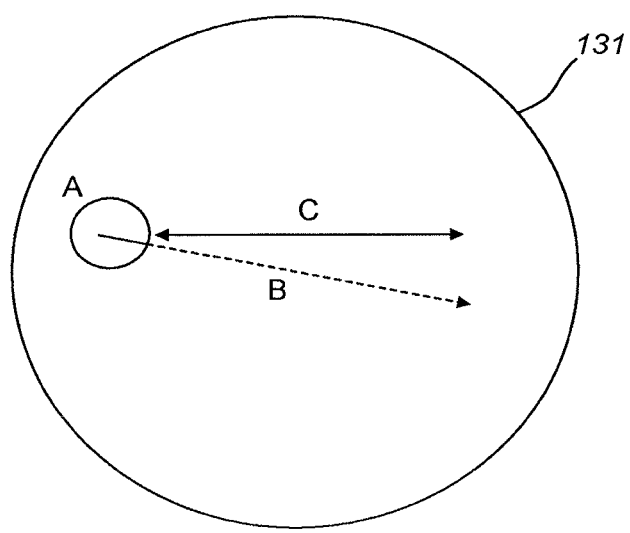

As illustrated for example in FIGS. 4 and 5, a tap or click by the user on a single position of the inner area 131 is converted to an absolute position in a grid 141 having a low resolution, such as 5 horizontal cells by 3 vertical cells. This absolute position may be used to select an item in a corresponding grid in a user interface component 142. For example, as shown in FIG. 4, a tap in a position corresponding to the coordinate {2, 3} on the grid 141 may cause the user interface component 142 to highlight a cell with a corresponding coordinate on a displayed grid. Where the tap is performed with enough force to close a tactile switch of the inner area 131, this is recorded as a 'click' by the RCU interface 29 and may result in a different command being output to the user interface 142, which may then perform a different action depending whether a tap or a click is performed at an absolute position. Alternatively, a click may be required and a tap alone may result in no action.

In another example, the user may input a relative movement command, for example using a touch movement or gesture performed on the inner or outer area 131, 132 of the touch pad 130. The RCU interface 29 receives as input the periodic X and Y coordinates of the touch position and detects whether a series of these periodic coordinates corresponds to a predefined gesture, for example by reference to a stored gesture library. If a predefined gesture is detected, the RCU interface 29 outputs the gesture with detected parameter values, if relevant. The output gestures are provided as periodic input to the UI component(s) 142. Preferably, this output is continuous so that the user interface can respond to the gesture as it is performed. This allows the user interface to respond smoothly, preferably with an animation effect to provide visual feedback to the user.

A plurality of different possible gestures may be predefined in the gesture library, and in the present embodiment there are at least two such gestures, referred to as 'slide' and 'swipe'. A 'slide' gesture comprises a long, approximately linear touch movement; the corresponding output indicates the velocity and optionally the acceleration of the movement, as well as its horizontal or vertical direction; the corresponding output is preferably output substantially continuously or periodically, and varies according to the current properties of the 'slide' gesture until the gesture is determined to have finished, for example in response to the user moving out of contact with the touch pad 130. A 'swipe' gesture comprises a short, quick linear touch movement; the corresponding output is simply the horizontal or vertical direction of the swipe.

Preferably, the RCU interface 29 filters out small, involuntary gestures by the user, caused for example by the user resting a digit on the touch pad 130. As illustrated in FIG. 5, the RCU interface 29 does not respond to any movement within a zone A defined with respect to the initial touch point on the inner area 131, for example within a predetermined radius from the initial touch point. However, when the touch point moves outside the zone A, the RCU interface 29 determines the direction of travel of the touch point from the initial point of contact, and begins to output this direction.

The UI components 142 are used to display the EPG in a grid format, and various horizontal or vertical menus, and therefore need only respond to vertical or horizontal movement commands; diagonal or rotational commands are not supported. The RCU interface 29 therefore interprets a directional gesture by the user as being entirely horizontal or vertical and provides a corresponding output to the UI components 142. For example, the user may move the touch point along the vector B, which is at an angle to the horizontal direction but closer to being horizontal than vertical. The RCU interface 29 therefore resolves the vector B along a horizontal vector C. The direction of the gesture is 'locked' in a horizontal direction, and any subsequent movement of the touch point will be resolved in that direction until the user's finger is lifted from the touch pad 130. Hence, the RCU interface 29 will output subsequent changes of direction along the horizontal, but will not respond to any vertical component of the gesture. Likewise, if the gesture is determined to be vertical, only the vertical component will be output.

Figure 6:
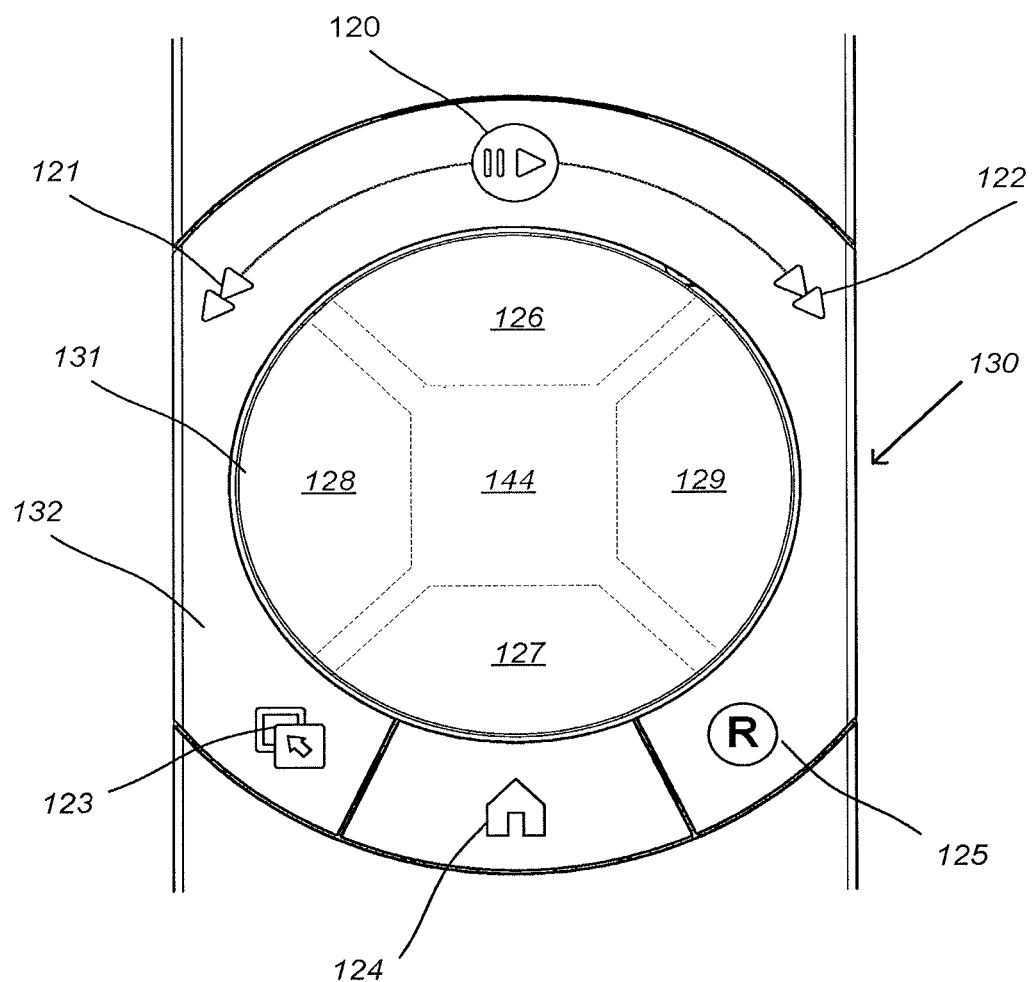
FIG. 6 shows virtual button areas on a touch pad of the RCU.

The RCU interface 29 may also respond to discrete taps or clicks on predetermined areas of the touch pad 130 corresponding to virtual buttons, as shown for example in FIG. 6. For example, on the inner area 131, virtual 'up', 'down', 'left' and 'right' buttons 126, 127, 128, 129 may be defined, optionally with a central 'select' button 144, such that a tap or click in the corresponding area causes the RCU interface 29 to output an up, down, left, right or select command. These commands may be advantageous for backwards compatibility with remote or game controls that have corresponding physical buttons. The virtual buttons need not be visually marked on the inner area 131, and their shape and size may be reconfigured according to user interface requirements.

Where the inner area 131 has only one corresponding tactile switch, the position of a 'click' may be determined from the detected touch position on the inner area 131. Therefore, multiple virtual clickable buttons may be defined, using only a single tactile switch.

Virtual buttons may also be defined on the outer area 132. In this example, the upper section of the outer area 132 contains virtual play/pause button 120, rewind button 121 and fast forward button 122, such that a discrete tap on these buttons causes the RCU interface 29 to output a corresponding play/pause, rewind and fast forward command. Multiple taps of the rewind button 121 or fast forward button 122 may increase the speed of rewinding or fast forwarding respectively, for example from 2× to 6×, 12× and 30× speed with each tap. A 'slide' gesture, for example from the play/pause button 120 towards the rewind button 121 or fast forward button 122, may generate a corresponding rewind or fast forward speed command, with a speed dependent on the length and/or speed of the 'slide' gesture. A slide gesture may be followed by a tap, which causes a current rewind or fast forward operation to decrease in speed or stop altogether.

The RCU interface 29 and UI component 142 may also respond to a combination of a gesture and one or more clicks. For example, a 'slide' followed by one or more clicks may be used to scroll through items in the user interface and then step through individual items, giving a combination of gross and fine control. This may be useful for example when controlling an on-screen keyboard, where the slide gesture is used for relative movement to an area of the keyboard, while the clicks are used to select between different keys within that area.

User Interface with Visual Feedback

The UI components 142 provide continuous visual feedback of user interaction with the RCU 28, and particularly with the touch pad 130. With a conventional RCU, a single button press causes a discrete change to the user interface, such as a different item being selected or highlighted, so the user does not need additional visual feedback. With an analog direction control such as the touch pad 130, a gesture may not immediately result in a discrete change to the user interface, so it is advantageous to provide continuous visual feedback in response to a gesture. On the other hand, it would be distracting to show on the display a pointer that follows every movement of the analog direction control, as is the case with a conventional mouse pointer.

In an embodiment of the invention, an indicator is shown on the display indicating horizontal or vertical motion detected on the touch pad 130, with the filtering and directional locking described above. The indicator may comprise a background lighting effect, glint or 'spotlight' centred on the location of the indicator on the display. The indicator is displayed separately from highlighting of EPG or menu items on the display, but the highlighting may change in response to the indicator moving on to a displayed item, as described below with reference to FIGS. 6a to 6c, which show an example of items I1, I2 and I3 in a grid as part of an EPG display.

Figure 7A:
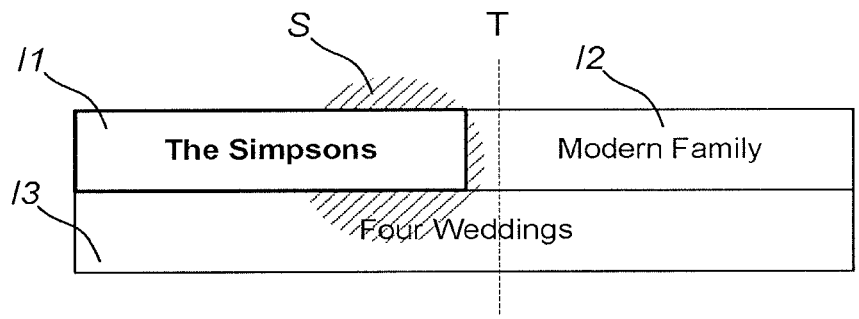
FIGS. 7a to 7c are schematic diagrams illustrating continuous visual feedback on a display in response to a gesture performed on the touch pad.
Figure 7B:
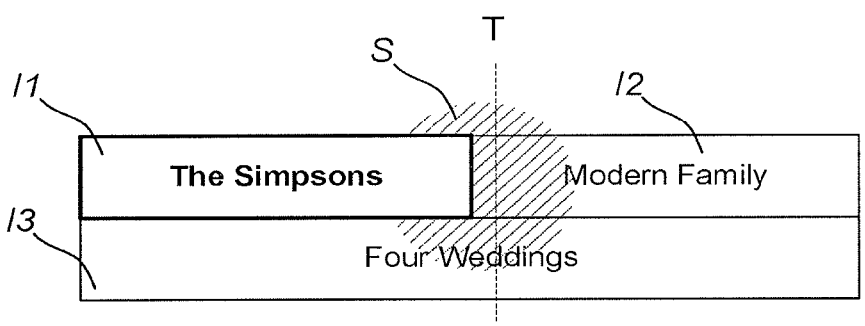
Figure 7C:
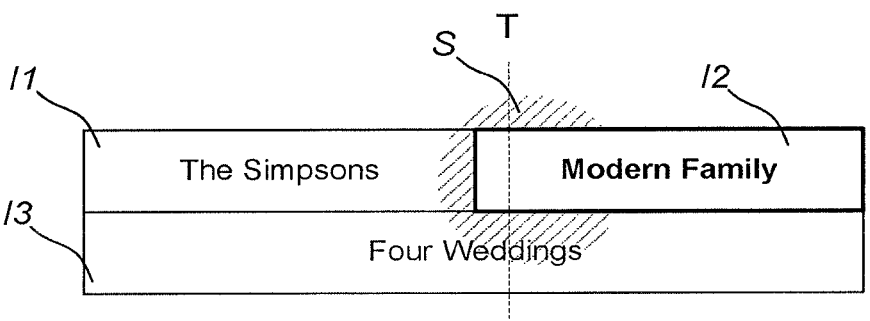

The indicator centre position is shown as a dashed cross in the figures, but in an actual display only the spotlight, centred on the indicator position, is shown. As shown in FIG. 7a, the item I1 is currently highlighted and the indicator S is centred under the item I1. The user performs a horizontal slide gesture to the right, so that the centre of the indicator S moves under the next item I2 to the right. A horizontal threshold T is defined, a predetermined distance past the border between the items I1 and I2 in the direction of travel of the indicator S. In FIG. 7b, the indicator position has travelled past the border, but not past the threshold T, and item I1 is still highlighted. In FIG. 7c, the indicator position has travelled past the threshold T and the next item I2 is now highlighted.

A similar procedure is followed when performing a slide gesture to the left, except that the threshold T is define a predetermined distance to the left of the border between the items I1 and I2, since the direction of travel is to the left from item I2 to I1.

A similar procedure may be followed when moving in a vertical direction, with the threshold T defined a predetermined distance past a horizontal border between items in the direction of travel. The threshold T provides hysteresis between the indicator position and the highlighting of items, so that the highlighting does not flip rapidly between items as the indicator position passes back and forth over the border between them.

Alternatively, the threshold T may be defined a predetermined distance before the border, or on the border, determining how quickly the next item should be highlighted, and whether hysteresis is required.

However, preferably the spotlight or other indicator S does not move in the vertical direction, but a scroll operation in the vertical direction causes the menu items to scroll vertically beneath the indicator. When the scroll operation is completed (for example by the user ending a slide gesture), the menu items may 'snap' into alignment with the indicator S so that only one menu item is highlighted, but this may cause a problem when the indicator is half way between two menu items and it is not clear to the user which menu item will be selected.

Figure 8A:
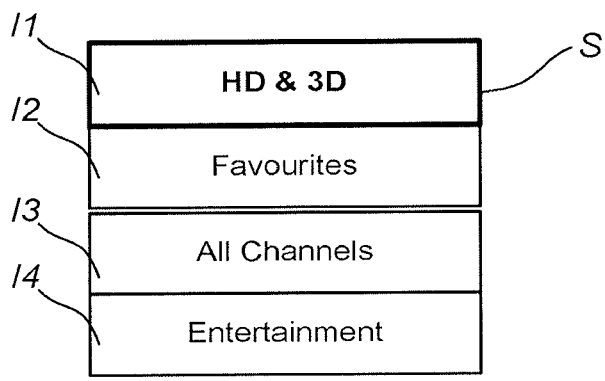
FIGS. 8a to 8c show a scroll operation for a vertical menu.
Figure 8B:
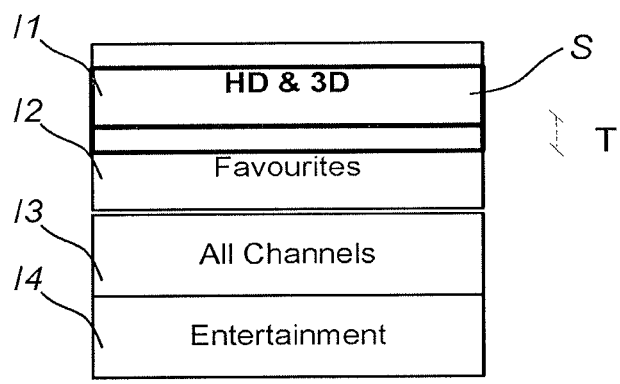
Figure 8C:
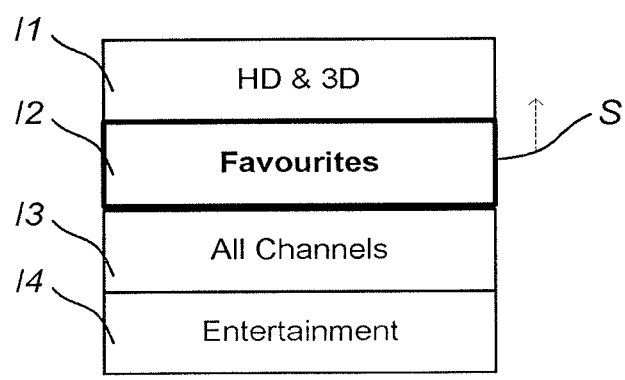

A solution to the above problem is illustrated in FIGS. 7a to 7c. In this case, a vertical menu comprises a set of vertically arranged rectangular items I1-I4 and the indicator S comprises a rectangle that is fixed in the vertical direction. At the start of a vertical scroll operation, as shown in FIG. 8a, the first item I1 (HD & 3D') is positioned under and aligned with the indicator S. In response to a vertical gesture input by the user, such as a 'slide' gesture, the vertical menu begins to move vertically under the indicator S, as shown in FIG. 8b. This provides visual feedback of the gesture to the user. When the vertical menu has moved by a threshold amount T less than half the vertical height of the items I1-I4, for example by 20-30% or 25% of the vertical height, the vertical menu 'snaps' or slides quickly into the position shown in FIG. 8c, as indicated by the dashed arrow, with the indicator S aligned with the next item I2 in the direction of movement. If the gesture continues, the menu continues to move as shown in FIGS. 7b and 7c for each item I1-I4 in turn.

In a variant where the items I1-I4 have varying vertical heights, the threshold amount for initiating the 'snap' action may be a constant, preferably less than half the smallest height among the items I1-I4. Hence, the same length of gesture is required to move each item under the indicator S. Alternatively, the threshold amount may be proportional to the height of the next item I1-I4 in the direction of motion and/or the height of the currently selected item I1-I4.

A similar 'snap' action may be applied to alternative arrangements, for example to horizontal menus and/or to scenarios where the indicator S moves and the items I1-I4 are stationary.

Figure 9:
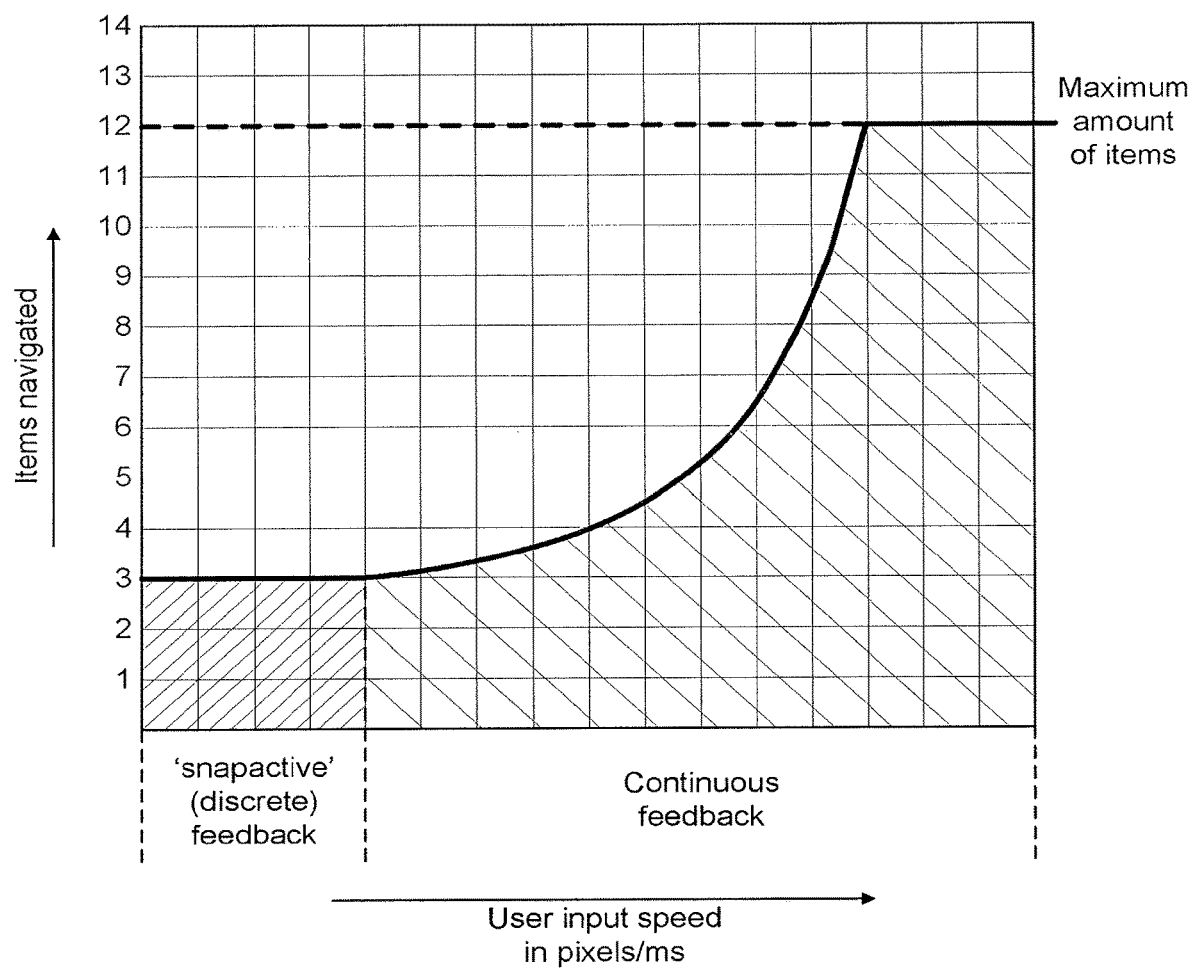
FIG. 9 is a graph illustrating a scrolling method.

The scrolling motion may be dependent on the speed and/or acceleration of the gesture: for example, if the speed and/or acceleration is above a predetermined threshold, the vertical menu scrolls without the 'snap' action. This allows quick navigation through a list until the desired item approaches, at which point the user may slow the gesture and allow a positive selection of the desired item by means of the 'snap' action. Additionally or alternatively, the scroll 'gearing' (i.e. the distance or number of items moved in the user interface as a function of the distance moved in the gesture) may depend on the speed and/or acceleration of the gesture. For example, as shown in FIG. 9, the scroll gearing may be constant at low gesture speed range S1, but may increase at a higher gesture speed range S2 until a maximum gearing is reached at gesture speed range S3. The 'snap' action is only performed within the low gesture speed range S1. This allows quick navigation through a long menu, with precise selection of the menu item required.

Some users may inadvertently rest a digit on the touch pad 130, which may cause involuntary interaction with the user interface if the digit is moved. To alert the user to such contact, the spotlight or other indicator S may be displayed only in response to user contact with the touch pad 130, or the indicator S may change in brightness or appearance in response to the user contact.

Interpolation

In the user interface 142, it is desirable to animate changes smoothly but responsively to user input. The user interface 142 should respond to the user input without excessive lag, but some degree of lag may be desirable so that the changes appear smooth. In conventional animation techniques known as 'tweening', start and end points are defined and the animation then follows a predefined transition between the start and end points. However, in the present embodiments the user input and hence the end point may be constantly changing, for example as the speed, position or acceleration of a 'slide' gesture changes.

In an embodiment of the invention, interpolation between start and end points is determined on the basis of the current position and the current destination or target position. For example, in the case of animated motion in the x direction, given the current position $x_s$ and the destination position $x_e$, the next position $x_1$ is calculated as follows:

$$x_1 = x_s + (x_e - x_s)/I \qquad (1)$$

where I is the level of interpolation.

This type of animation combines responsiveness and smoothness. In contrast to 'tween' animation, there is no need to calculate a long list of coordinates from the beginning to the end, and there is no need to specify the time that the animation takes. The destination position can constantly change without affecting smoothness, and providing a quick response to user interactions.

The level of interpolation I may be a constant. However, this would result in the animation slowing down when it reaches the destination position. Hence, a variable level of interpolation I may be calculated, for example according to the following equation:

$$I = \min(|\text{offset}|, T) * (I_{max} - I_{min})/T + I_{min} \qquad (2)$$

where:
offset is the distance between the current and destination position $(x_e - x_s)$
$I_{min}$ is a minimum level of interpolation, preferably but not necessarily constant;
$I_{max}$ is a maximum level of interpolation, preferably but not necessarily constant; and
T is a threshold offset value that determines when the level of interpolation starts changing linearly from $I_{max}$ to $I_{min}$.

If the absolute value of the offset is greater than the threshold T, then the level of interpolation I is equal to $I_{max}$. When the offset is lower than the threshold T, I changes linearly from $I_{max}$ to $I_{min}$. This variable level of interpolation provides a better control and snaps faster to the destination point.

Figure 10A:
FIGS. 10a to 10c are schematic illustrations of an animated movement using an interpolation technique.
Figure 10B:
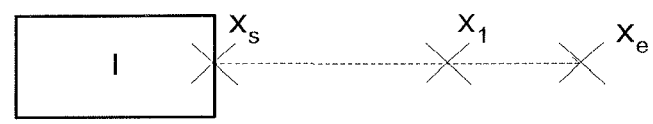
Figure 10C:
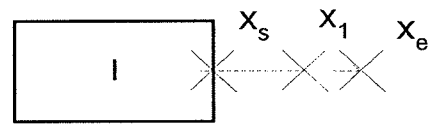

An example of this interpolation technique is shown in FIGS. 10a to 10c, for an item I having a current position $x_s$. The destination position $x_e$ changes in response to a user gesture input between FIGS. 8a and 8b, and stays the same between FIGS. 8b and 8c. In each case, the new position $x_1$ is calculated and becomes the current position $x_s$ for the next frame.

A new value of the next position $x_1$ may be calculated for each successive frame. Preferably, the frame rate is synchronised with the vertical refresh rate, for example at 50 or 60 Hz. However, the frame rate may drop in some circumstances, such as high processor load. For the interpolation to appear smooth, the new values are preferably calculated at a constant rate, independent of the frame rate and for example synchronised to the vertical refresh rate. If the frame rate drops below the vertical refresh rate, the new value will be used that is current when the frame is created.

The above embodiment has been described with reference to a change in position, but the interpolation technique may be applied to changes in other visual properties, such as brightness.

Full EPG Display

Figures 11A, 11B:
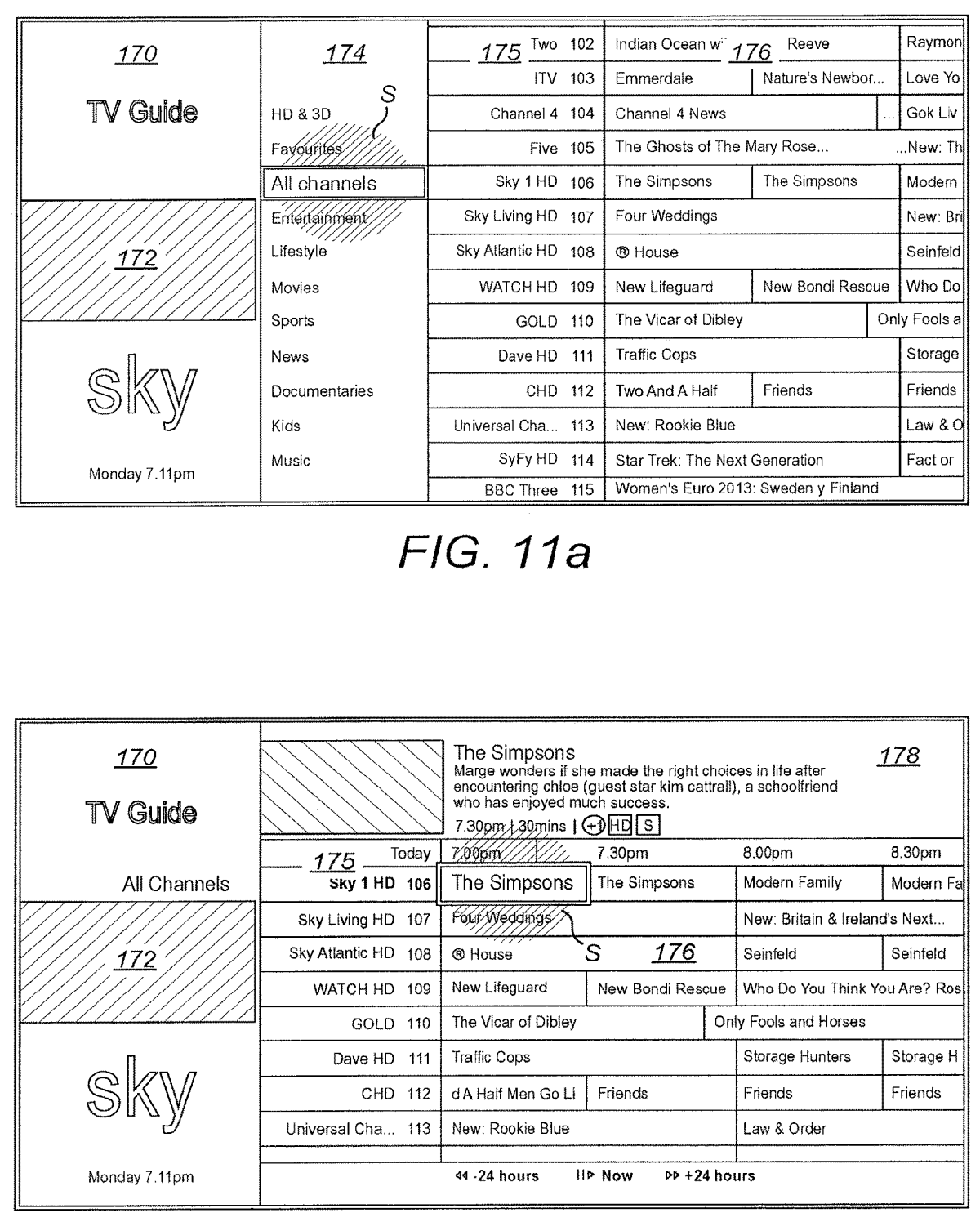

FIG. 11a shows an example of a full-screen EPG display, comprising one of more vertical columns, and an EPG grid. A status column 170 includes a mini-TV window 172 showing a live feed of a currently tuned channel. A channel filter column 174 shows a menu of channel filters to be applied to the full EPG, which comprises a channel column 175 containing channel names, and an EPG grid 176 indicating programme titles in each channel, arranged along a horizontal axis representing broadcast time.

When a channel filter is selected from the channel filter column 174, an animation effect is displayed whereby the channel filter column 174 appears to slide away behind the status column 170, and the selected channel filter is displayed in the status column 170, as shown in FIG. 11b. This provides a visual cue to the user that the filter has been applied, and avoids the channel filter column 174 taking up space when it is not needed. The user may cause the channel filter column 174 to reappear by navigating to the status column 170 and selecting the channel filter indicated therein.

Figures 11C, 11D:

The user may navigate between the columns 170, 174, 175 and EPG grid 176, using gestures or clicks on the inner area 131 of the touch pad. The user may navigate to the EPG grid 176 and highlight a programme, whereupon a corresponding programme synopsis is displayed in a banner 178 at the top of the full EPG 176. As the user highlights other programmes, for example using a 'swipe' gesture or button press, the banner 178 is updated to show the corresponding synopsis. Alternatively, the user may scroll horizontally or vertically through the full EPG 176, for example using the 'slide' gesture. In this case, as shown in FIG. 11c, the banner 178 is automatically hidden during the scrolling operation. When the scrolling operation is complete, the banner 178 is automatically displayed once again, as shown for example in Figure lib, but showing the synopsis for the new highlighted programme. Advantageously, the banner 178 is automatically removed during scrolling when it would not be required, and would restrict the amount of space available for the full EPG 176.

Scrolling of the EPG grid 176 is controlled so that the spotlight S remains at a constant vertical level, while horizontal movement of the spotlight S is constrained by left and right 'locking points' LL and LR, as illustrated in FIG. 11d. Hence, when the user scrolls vertically (i.e. by channel), the spotlight S stays at the same vertical position and the EPG grid 176 scrolls vertically under the spotlight S. When the user scrolls horizontally (i.e. by time), the spotlight S moves horizontally and the EPG grid 176 remains stationary until the centre of the spotlight S reaches the left or right locking point LL, LR, depending on the direction of scrolling. If the user scrolls beyond that point, the EPG grid 176 scrolls horizontally while the spotlight S remains stationary, until a boundary of the EPG grid is reached.

The left hand boundary of the EPG grid 176 is defined with respect to the current time, for example the current time rounded down to the nearest half hour. When the EPG grid 176 reaches the left hand boundary, and the user continues to scroll left, the spotlight S is allowed to move left past the left locking point LL, for example into one of the columns 170, 174, 175.

The user may be required to issue a separate command to move out of the EPG 175, 176 across a component border into another column, such as the status column 170.

The right hand boundary of the EPG grid 176 is defined by the limit of available EPG information, for example approximately 7.5 days after the current time. When the EPG grid is scrolled to the right hand boundary, the spotlight S is allowed to move right past the right locking point LR, for example to select a programme past the right locking point LR.

Scrolling of the EPG grid 176 is controlled by gestures and/or clicks, as described above. The speed of scrolling may be dependent on the speed and/or acceleration of the 'slide' gesture that causes the scrolling operation. The scrolling display is animated so that the scrolling speed appears to match the slide gesture speed.

The 'slide' gesture may continue across multiple items in a horizontal or vertical direction, with the indicator position continuing to move and the highlighting changing as described above, until the gesture is ended. Preferably, a 'slide gesture' should not be allowed to continue across a UI component boundary, for example from an EPG grid guide 176 to an adjacent menu, such as the channel filter column 174. In this case, the indicator position is stopped at or around the border of the last item in the grid guide, and is prevented from passing to an adjacent menu. The user must then perform another gesture, such as a 'swipe' gesture or a direction 'click', to move the highlight to the adjacent menu. To provide visual feedback of this limitation, an animation effect may be displayed in which the spotlight S is allowed to move a small distance into the display area of the adjacent menu, without highlighting any item in the adjacent menu, but returns back into the display area of the grid guide when the gesture is ended.

Image View

Figure 12A:
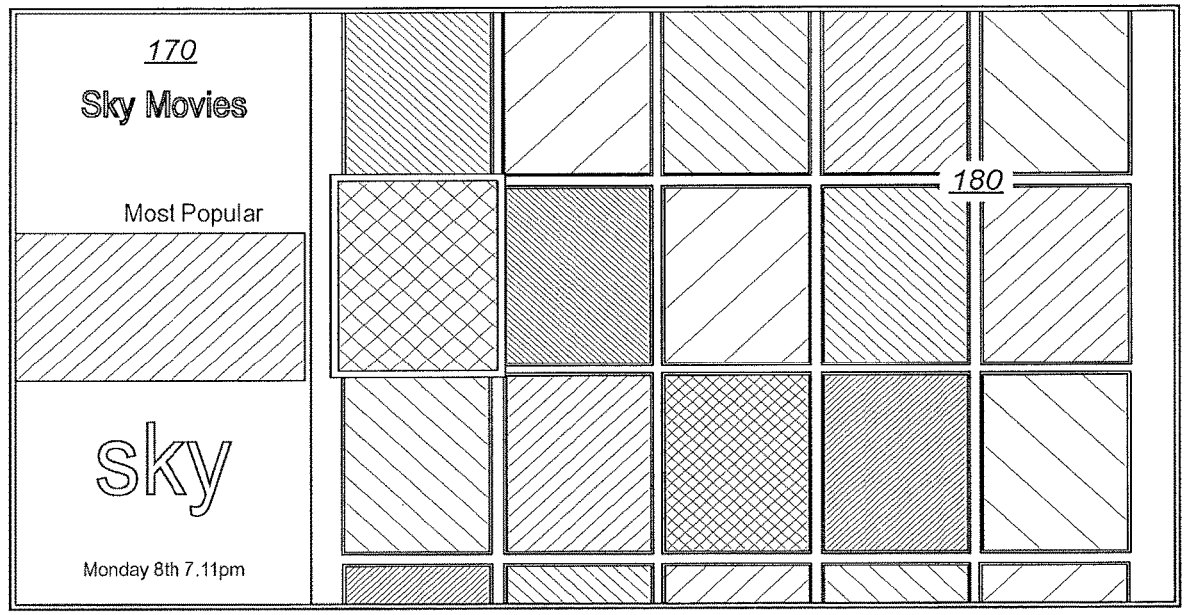
FIGS. 12a and 12b are screenshots of a programme image display.
Figure 12B:
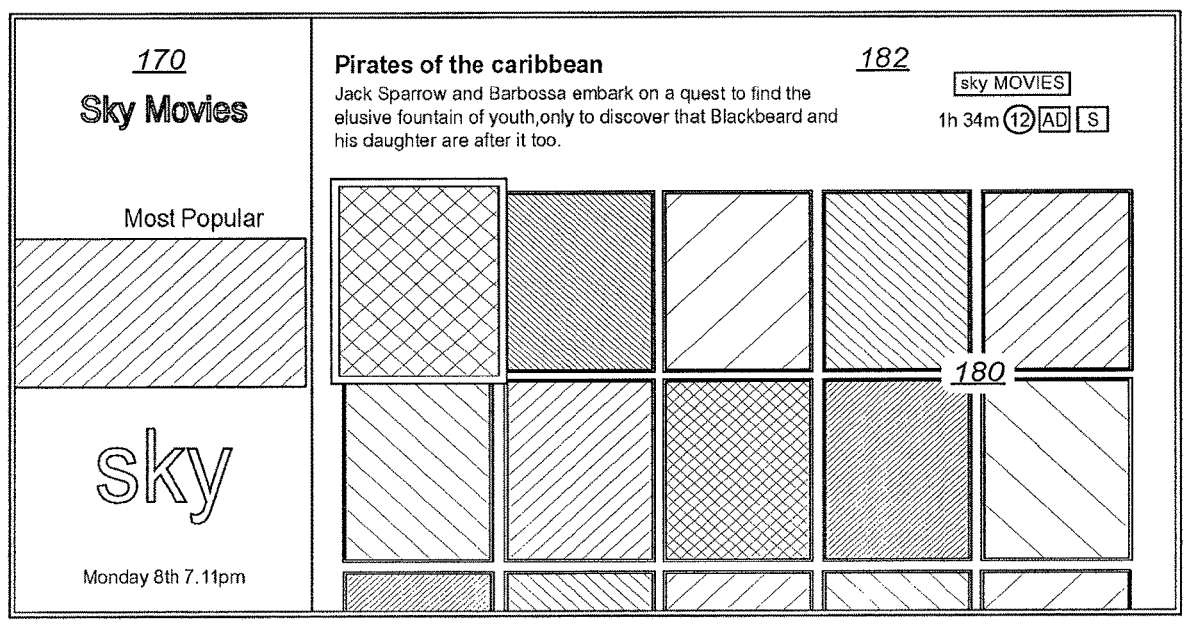

A programme image display is shown in FIGS. 12a and 12b, in which programmes are shown as still images 180 rather than programme titles. This EPG display is suitable for Video on Demand (VOD), Push VOD or pre-recorded programme selection, where broadcast times and channels are not relevant, and selection of a still image 180 causes the programme to be viewed substantially immediately. Alternatively, this view could be used to preview programmes to be broadcast, and selection of a still image causes the corresponding programme to be recorded when it is broadcast.

As shown in FIG. 12a, no programme synopsis is shown during scrolling through the images 180, using for example a 'slide' gesture. When the scrolling operation is concluded, a synopsis bar 182 is displayed above the images 180, showing a synopsis of the currently selected image, as shown in FIG. 12b.

Review Buffer Indicator

The receiver 3, when tuned to a channel for live viewing, begins to record that channel in a review buffer so that the currently viewed channel can be paused, rewound and fast forwarded back to the live viewing point. Technical details of the review buffer may be substantially as described in the applicant's patent publication WO-A-2003/043320.

As shown in FIGS. 13a to 13d, the status of the review buffer and viewing mode may be indicated by a progress bar 150 superimposed on the programme being viewed. The progress bar 150 may be displayed for a predetermined time after tuning to a channel, or in response to a command from the user, such as a pause, fast forward or rewind command. The start and end times of the programme being viewed are displayed respectively at the left and right hand sides of the progress bar 150, and the current time is displayed to the bottom left of the progress bar 150. The programme title of the programme being viewed is displayed above the progress bar 150. The extent of the review buffer is shown by a highlighted section of the progress bar 150.

A viewing point indicator 152 is displayed on the progress bar 150 at the current viewing point of the programme. The viewing point indicator 152 comprises an icon indicating the viewing mode, for example play, pause, fast forward and rewind. The time of the current viewing point from the start time of the programme is displayed below the viewing point indicator 152. In fast forward and rewind mode, the speed is indicated above the viewing point indicator 152.

In the example shown in FIGS. 13a to 13d, the receiver 3 has been tuned to the current channel from approximately 4:45 pm. The programme 'Stargate SG-1' was broadcast on that channel from 4 pm to 5 pm, and the programme 'Modern Family—Bringing Up Baby' is being broadcast from 5 pm to 5:30 pm. The current time is 5:20 pm.

Figure 13A:
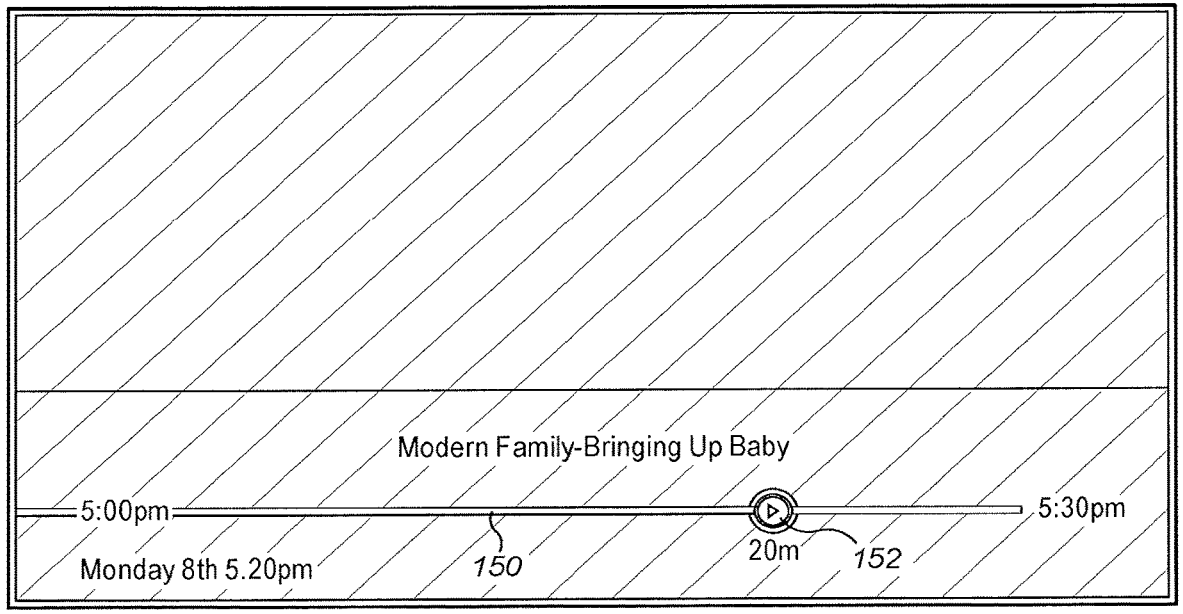
FIGS. 13a to 13d are screenshots showing a progress bar display.
Figure 13B:
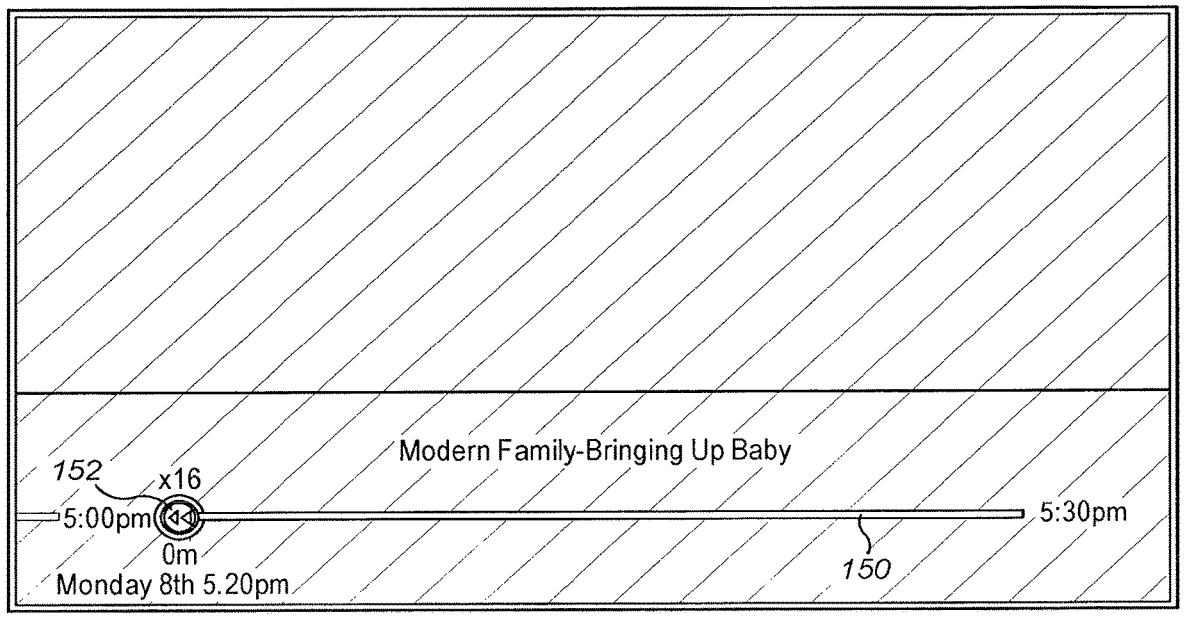

FIG. 13a shows the current programme being viewed live. The user then changes the viewing mode to rewind, as 16x speed, to take the viewing point back to the beginning of the current programme, broadcast at 5 pm, as shown in FIG. 13b.

Figure 13C:
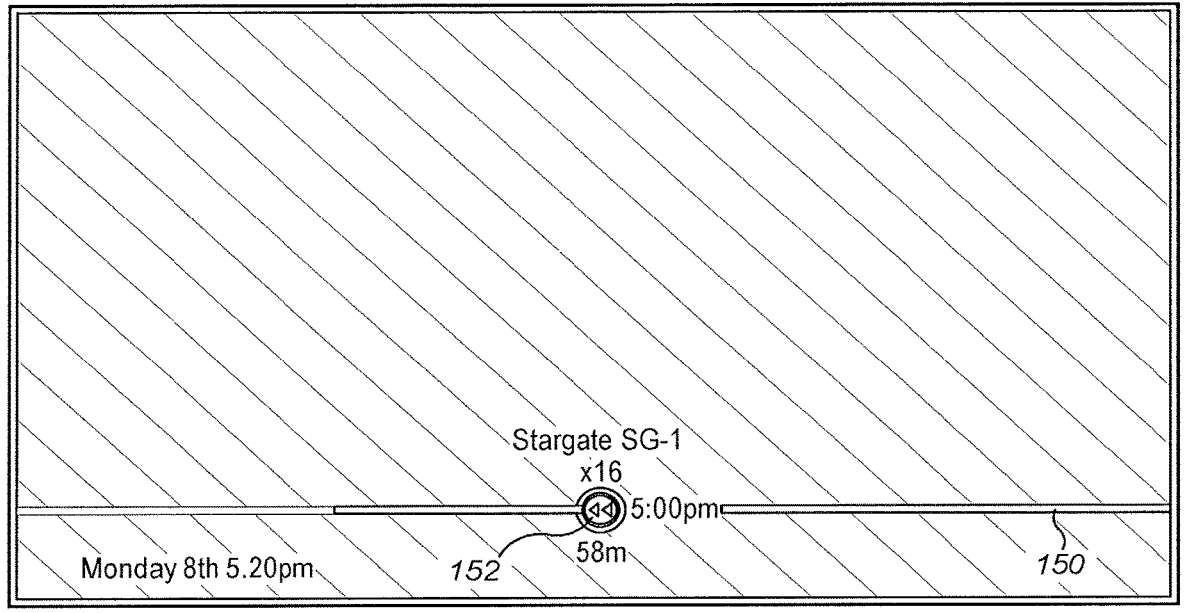
Figure 13D:
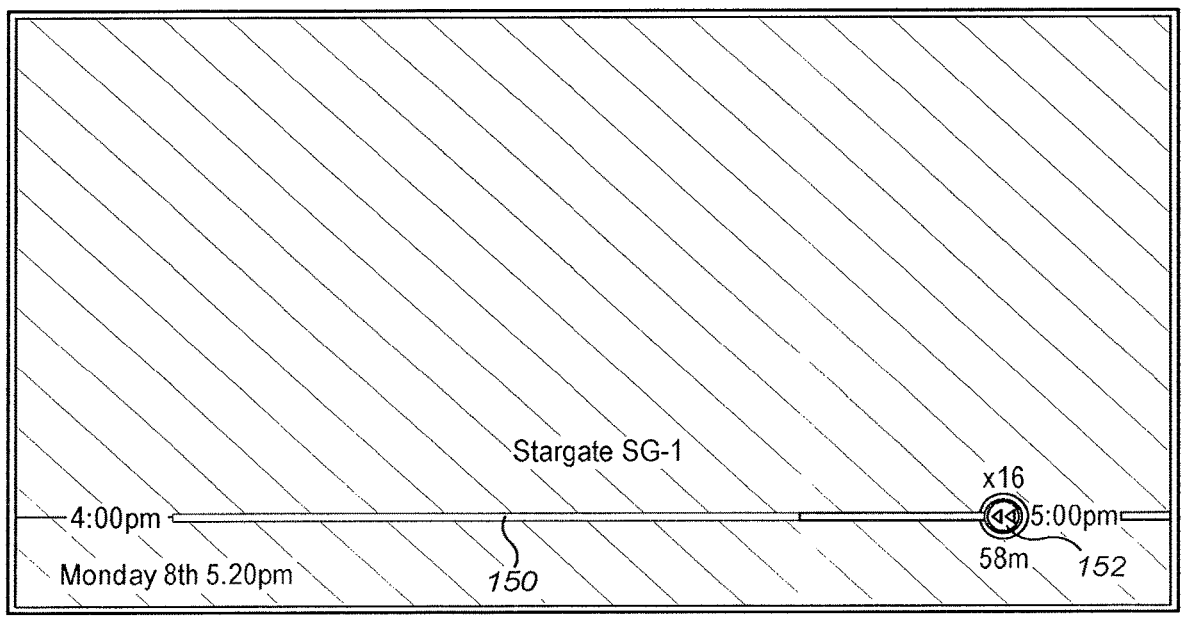

When the viewing point is moved back before the beginning of the current programme, as shown in FIGS. 13c and 13d, an animation effect shows the progress bar 150 sliding to the right so that the end time of the previous programme is now at the right hand side of the progress bar 150. This provides an intuitive visual cue that the user has moved to another programme in the review buffer. The user may then rewind back to the beginning of the review buffer, as indicated by the left hand end of the highlighted section. Alternatively, the user may fast forward back to the current programme; as the viewing point moves to the current programme, the progress bar appears to slide to the left using a similar animation effect.

EPG Banner

Figure 14A:
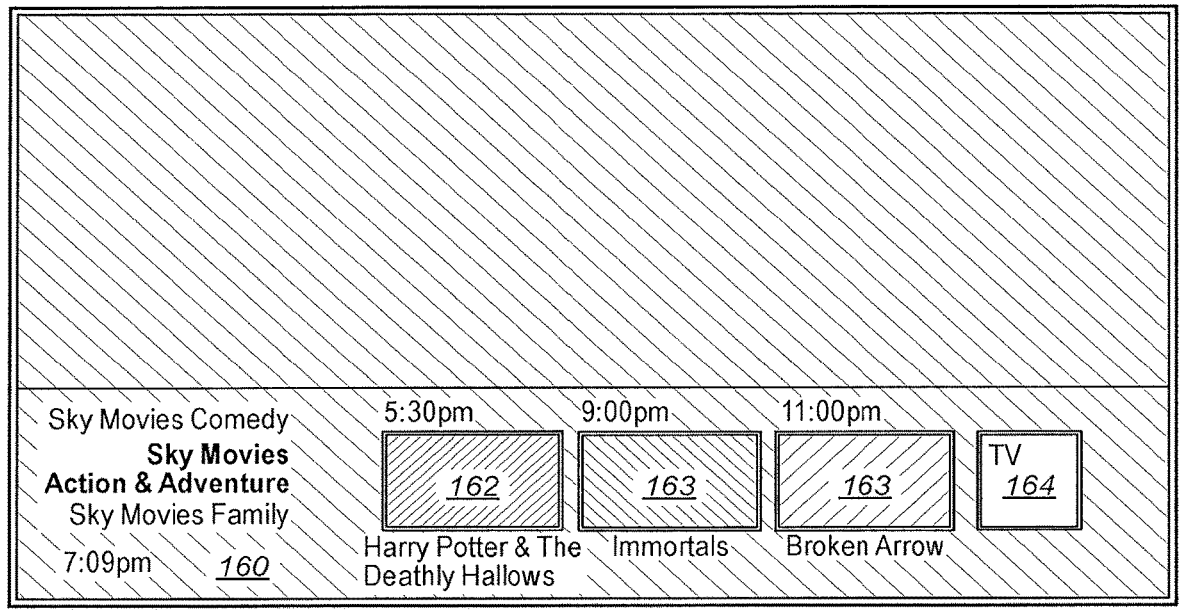
FIGS. 14a to 14c are screenshots showing a mini-EPG display.
Figure 14B:
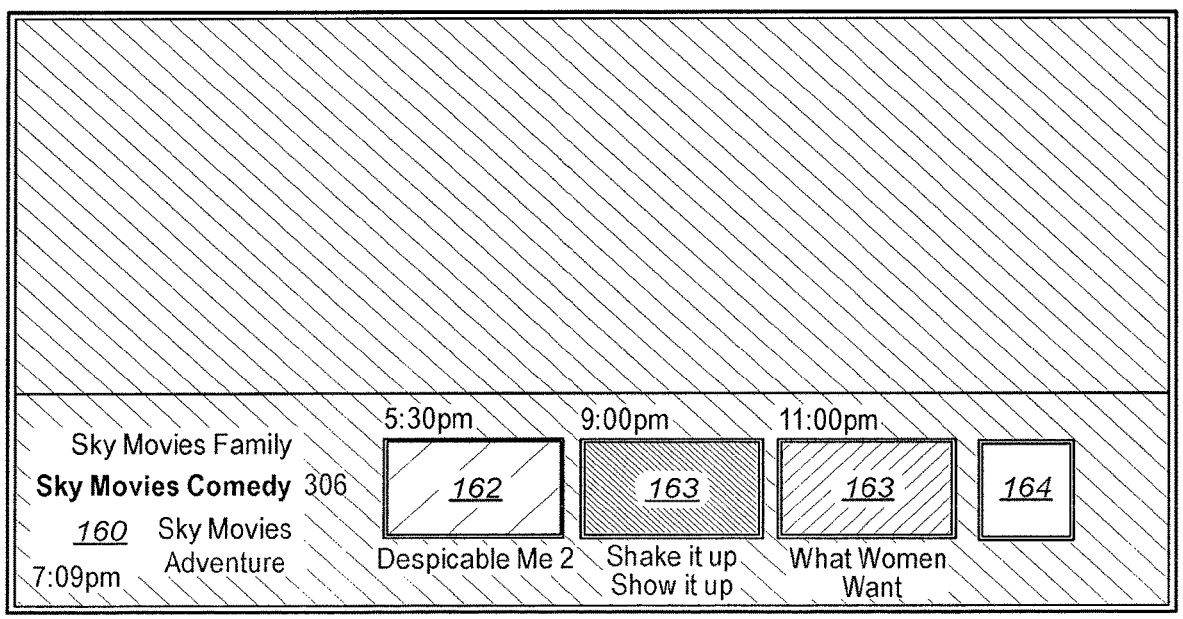
Figure 14C:
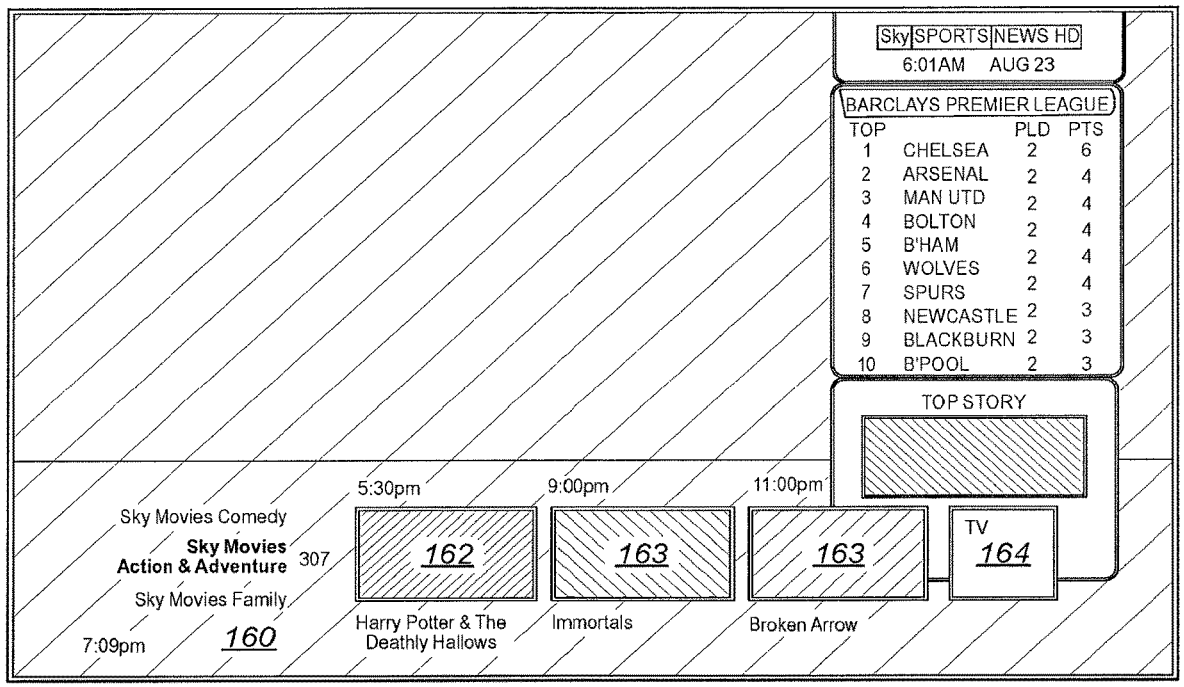

While viewing a programme, a user may issue a command to display a EPG banner 160 across the bottom of the screen, as shown in FIGS. 14a to 14c. The left hand side of the banner 160 shows the selected channel name and number, with the names of the immediately preceding and following channels on a channel list shown respectively above and below.

Current and following programmes in the selected channel are indicated visually and in sequence along the banner 160, with the programme titles and start times. The current programme is shown as a live feed in a mini TV window 162. The following programmes in the selected channel are shown as still images. When one of these images is select, programme synopsis information may be displayed, together with a menu option to record the programme.

The user may watch a channel in full screen while watching another channel in the mini TV window 162, by selecting that channel in the EPG banner 160. At least one tuner 10 is dedicated to the EPG banner 160 so that it is always available to provide the live feed in the mini TV window 162.

As shown in FIGS. 14a and 14b, the EPG banner 160 is normally displayed with a semi-transparent background so that as much as possible of the programme being shown in full screen can be seen. However, channels dedicated to news and sport for example may carry programming with information banners, such as news or stock tickers, at the bottom of the screen. These in-programme banners may show through the superimposed EPG banner 160, giving a cluttered and possible illegible appearance. To avoid this problem, the receiver stores a predetermined list of channels likely to contain in-programme banners, and applies a higher opacity to the EPG banner 160 when superimposed on a full-screen display of a channel in the predetermined list, as shown for example in FIG. 14c.

The right hand side of the EPG banner contains a 'TV Guide' menu option 164 which, if selected, brings up a full-screen EPG display, for example as described above.

Multiple Screen Browsing

Figure 15A:
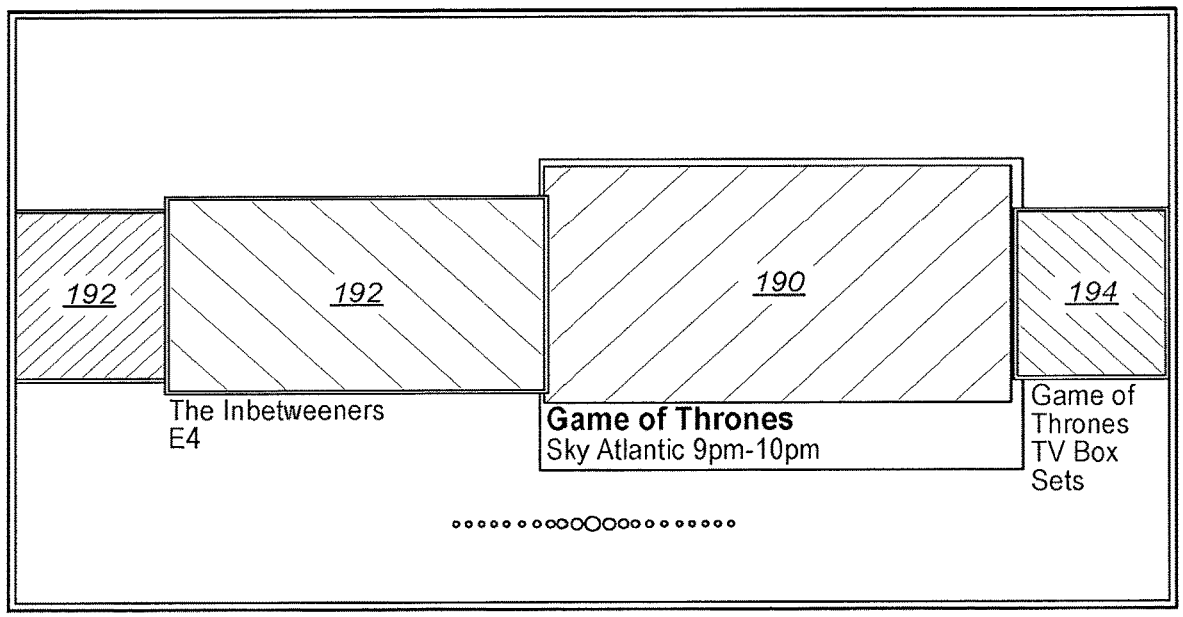
FIGS. 15a to 15c are screenshots showing a multiple screen browsing display.
Figure 15B:
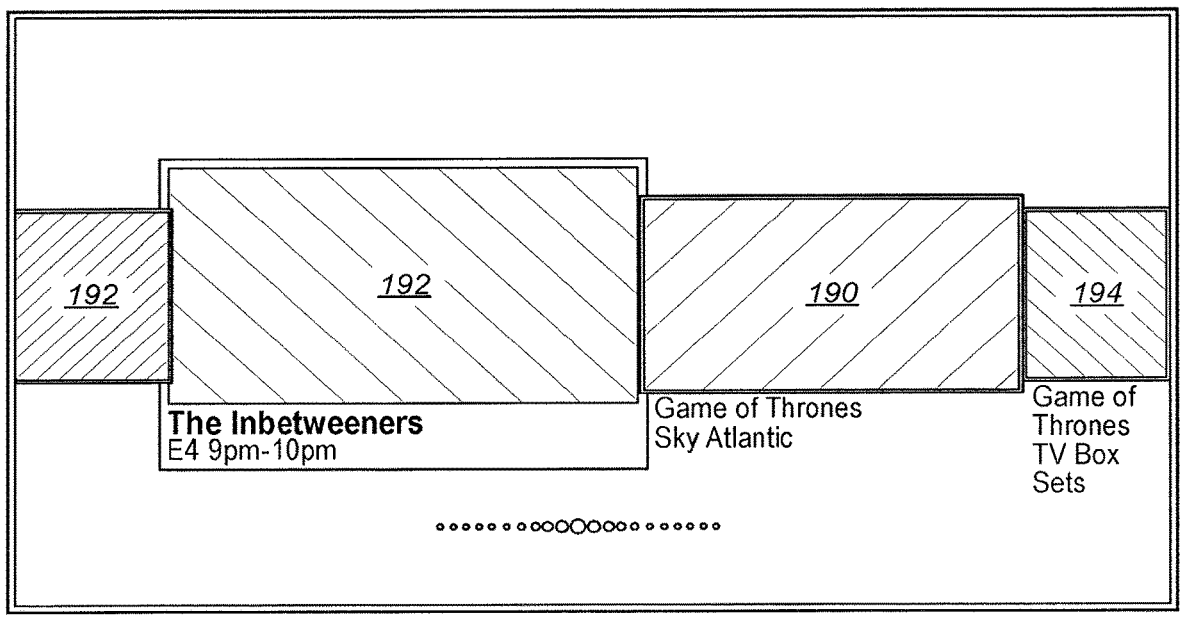
Figure 15C:
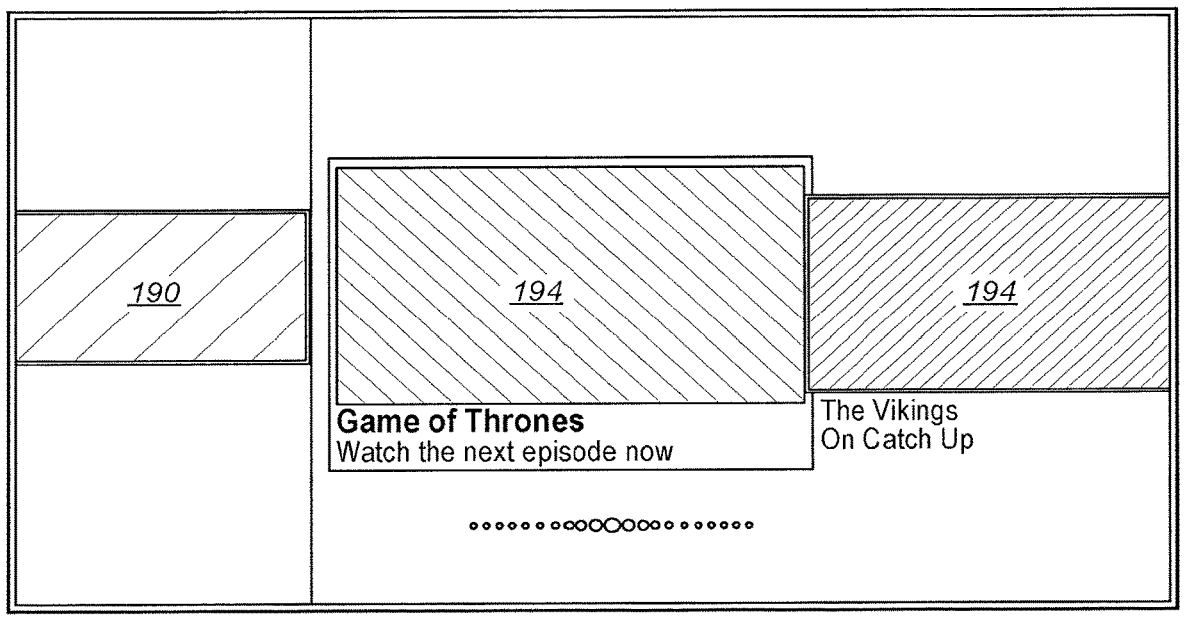

FIGS. 15a to 15c show a multiple screen browsing view, in which the current channel being viewed in shown in a current window 190, with previously viewed channels shown in previous windows 192 to the left of the current window 190, in order of previous viewing. The current channel is shown as a live feed in the current window 190. Previously viewed channels are also shown as live feeds or still images (e.g. a promotional image or screen grab from the last viewed or current programme) in their corresponding previous windows 192. The user may select one of the current window 190 and previous windows 192, and the audio content of the corresponding selected channel is output. The selected window 190, 192 may be highlighted visually, for example, by enlarging that window and/or providing a highlight similar to the 'spotlight' effect described above. Additional programme or channel information may be displayed for the channel or programme corresponding to the highlighted window. As shown in FIG. 15b, the user may navigate back and forth between the current window 190 and previous windows 192. This multiple screen view is particularly advantageous if the user wishes to monitor two or more programmes, such as sports or news programmes.

To the right of the current window 190, one or more suggestion windows 194 are displayed showing suggested programmes based on current and/or previously viewed programmes. For example, as shown in FIG. 15a, the current programme is 'Game of Thrones', and the suggested programmes are the 'Game of Thrones' box set. When the user navigates to the suggestion window 194, as shown in FIG. 15c, the user is presented with a selectable option to watch the next episode in the 'Game of Thrones' box set. In a further suggestion window 194 to the right, the suggested programme is 'The Vikings', based for example on the current viewing of 'Game of Thrones'.

The suggested programmes may be based on similarity in programme metadata to the current and previous programmes; this metadata may include genre and cast, for example. Alternatively or additionally, the suggested programmes may be based on historical viewing patterns of the user, or similar users.

Further Alternative Embodiments

The embodiments described above are illustrative of rather than limiting to the present invention. Alternative embodiments apparent on reading the above description may nevertheless fall within the scope of the invention.

In the embodiments described above, specific examples are provided of the various separate display screens of the EPG. As those skilled in the art will appreciate, many specific details of the illustrated screens are provided merely by way of example The above embodiments are presented as separate embodiments but those skilled in the art will appreciate that any combination of the display screens and aspects therein described in the above embodiments and alternatives is possible.

Embodiments include a method of providing an interactive user interface for a television display, responsive to a user-operated remote control having a touch-sensitive surface, the method comprising simultaneously displaying a plurality of selectable items and a position indicator, moving the position indicator relative to the plurality of selectable items according to a directional output from the touch-sensitive surface, and highlighting one or more of the selectable items in accordance with their proximity to the position indicator. In embodiments the movement of the position indicator is constrained to a horizontal or vertical direction according to the direction of the directional output. In embodiments the highlighting of the one or more selectable items changes in response to movement of the position indicator over a threshold defined with respect to the selectable items. In embodiments the one or more of the selectable items and the position indicator move automatically into relative alignment in response to relative movement between selectable items and the position indicator by a threshold distance. In embodiments the threshold distance is less than half of the distance between adjacent ones of the selectable items. In embodiments the one or more of the selectable items and the position indicator move automatically into relative alignment only when the speed and/or acceleration of the directional output is less than a predetermined threshold. In embodiments a ratio between the relative movement of the position indicator and the distance of the directional output increases as the speed and/or acceleration of the directional output increases. In embodiments the ratio increases up to a maximum ratio. In embodiments the position indicator is moved in response to said directional output having greater than a predetermined magnitude. In embodiments the plurality of selectable items are displayed in a first display area, and at least one further selectable item is displayed in a second area adjacent to the first display area and the position indicator is movable within the first display area according to a first said directional output and is moveable from the first display area to the second display area in response to a subsequent second said directional output discrete from said first directional output. Embodiments include receiving a command initiated by the user to select the highlighted item. Embodiments include receiving a non-directional touch output from the touch-sensitive surface, and responding thereto by selecting the one or more said highlighted items. Embodiments include receiving a positional output from the touch-sensitive surface, and responding thereto according to the position of the positional output. Embodiments include defining a plurality of different areas of the touch-sensitive surface, and responding to the positional output thereof according to the one of said different areas within which the positional output falls. In embodiments the touch-sensitive surface is coupled to a tactile switch and the method includes responding to the positional output of the touch sensitive surface when the tactile switch is closed. Embodiments include changing the appearance of the position indicator in response to user contact with the touch-sensitive surface.

Embodiments also include a method of controlling playback on a display of one or more recorded television programmes, responsive to a user-operated remote control having a touch-sensitive surface, the method comprising fast forwarding or rewinding said playback in response to a directional output from the touch-sensitive surface. In embodiments the playback is fast forwarded or rewound in response to the direction of said directional output. In embodiments the speed of said fast forwarding or rewinding is controlled according to a magnitude of the directional output. In embodiments the speed of said fast forwarding or rewinding is controlled according to a non-directional output from the touch-sensitive surface.

Embodiments also include a method of providing an interactive user interface for a television display, the method comprising displaying a plurality of programme items in a two-dimensional grid in which programme items are arranged horizontally by broadcast time and vertically by channel, together with a variable position indicator moveable in a horizontal direction as far as a predefined locking point on the display in response to one or more corresponding horizontal direction commands from a user, wherein a further direction command in said horizontal direction causes the grid to scroll in a horizontal direction while maintaining the horizontal position of the variable position indicator. In embodiments, when the grid is scrolled in the horizontal direction to a time boundary of the programme items, the position indicator is enabled to move in said direction past the locking point in response to a corresponding horizontal direction command from the user. In embodiments the grid is scrolled in a vertical direction in response to a vertical direction command from a user, while maintaining the vertical position of the position indicator.

Embodiments further include a method of providing an interactive user interface for a television display, the method comprising displaying a plurality of programme items, wherein a selectable one of the programme items is highlighted, and simultaneously displaying additional information relating to the highlighted said programme item, receiving a command to cause scrolling of the display of programme items, and in response thereto, removing said display of additional information while scrolling the display of programme items. In embodiments the display of the plurality of programme items comprises a two-dimensional grid display. In embodiments the programme items comprise pre-recorded or video-on-demand items.

Embodiments may also include a method of providing an interactive user interface for a television display, the method comprising displaying a two-dimensional programme guide, arranged by time and channel; displaying a vertical menu to one side of the programme guide, the menu relating to the display of the programme guide; receiving a user selection from the vertical menu, and in response thereto, updating the display of the programme guide according to the selection, and hiding the vertical menu. Embodiments include displaying a vertical status bar to one side of the vertical menu, and including information relating to the selection in the status bar when the vertical menu is hidden. In embodiments the vertical menu is hidden by an animation effect in which the vertical menu appears to be hidden behind the status bar.

Further embodiments include a method of providing an interactive user interface for a television display, the method comprising storing an index of programmes and/or channels having a high proportion of in-programme graphical information; and displaying a selected programme while superimposing programme information thereon; wherein the superimposed programme information is displayed with a reduced transparency if the selected programme corresponds to a programme or channel in said index. In embodiments said reduced transparency relates to a background transparency of the superimposed programme information. In embodiments the superimposed programme information comprises a programme guide occupying only a portion of the display. In embodiments the superimposed programme information includes programme video and/or still images.

Yet further embodiments include a method of providing an interactive user interface for a television display, the method comprising simultaneously displaying a first window comprising a live video feed from a first channel currently selected by the user, and a second window comprising a live video feed from a second channel previously selected by the user. Embodiments include displaying a third window comprising information relating to one or more programmes related to a programme displayed in the live video feed of the first window and/or second window. In embodiments one of said windows selected by the user is highlighted, and the user is able to select and highlight another one of said windows. outputting audio signals from the channel corresponding to the selected window. In embodiments a plurality of said second windows are displayed, each comprising a live video feed from a different channel previously selected by the user. In embodiments the plurality of said second windows are arranged in an order in which the corresponding channels were selected by the user.

Embodiments include a method of providing an interactive user interface including a user interface item having a current display parameter value, the method comprising a. determining a target parameter value for the user interface item, in response to a user input, b. determining a new display parameter value for the user interface item by interpolation between the current display parameter value and the target parameter value, and c. updating the current display parameter value to the new display parameter value. In embodiments a level of the interpolation is variable, dependent on the difference between the current display parameter value and the target parameter value. In embodiments the level of interpolation is limited to a maximum value if the difference is greater than a predetermined threshold. In embodiments a predetermined minimum level of the interpolation is defined. In embodiments the target parameter value is updated substantially continuously in response to the user input and the method is repeated with the updated target parameter value. In embodiments the parameter values are position values for the user interface item.

Embodiments include an apparatus arranged to perform any of the methods described herein. Embodiments also include a computer program comprising program code arranged to perform any of the methods described herein.

Embodiments include a remote control device for a television system, the device having a touch sensitive surface comprising a central area coupled to a tactile switch and a discrete peripheral area. In embodiments the discrete peripheral area comprises a touch-sensitive section that is not coupled to said tactile switch. In embodiments the central area is substantially circular and the peripheral area is annular or partially annular.

The invention claimed is:

1. A method of providing an interactive user interface for a television display, the method comprising displaying a plurality of programme items in a first display area,
   wherein a selectable one of the programme items is highlighted, and simultaneously displaying additional information relating to the highlighted said programme item in a second display area, receiving a command to cause scrolling of the display of programme items, and in response thereto, automatically removing said display of additional information from the second display area, automatically expanding the display of programme items to include the second display area while scrolling the display of programme items, and automatically redisplaying said display of additional information after the scrolling of the display of programme items is stopped,
   wherein the second display area is located above the first display area.

2. The method of claim 1, wherein different ones of the programme items are selectable, and the selected programme is highlighted, in response to a directional input from the user.

3. The method of claim 2, wherein the additional information changes to correspond to the highlighted programme.

4. The method of claim 2, wherein the directional input comprises a swipe gesture on a touch pad.

5. The method of claim 1, wherein the command to cause scrolling comprises a slide gesture on a touch pad.

6. The method of claim 1, wherein the additional information is displayed in the second display area after scrolling the display of programme items, relating to a highlighted one of the programme items.

7. The method of claim 1, wherein a bottom border of the second display area abuts a top border of the first display area.

8. The method of claim 1, wherein the redisplaying of additional information occurs after the scrolling of the display programme items is stopped is in the first display area.

9. The method of claim 1, wherein the interactive user interface comprises:
   a status area located to a left or to a right of the first display area and the second display area.

10. The method of claim 9, wherein the status area comprises a live feed window of a currently tuned channel.

11. The method of claim 9, wherein the interactive user interface comprises:
   a channel filter column located between the status area and the first display area,
   wherein the channel filter column comprises a plurality of channel filters.

12. The method of claim 11, further comprising:
   receiving a command to select a channel filter from the plurality of channel filters;
   automatically removing the channel filter column in response to the command to select the channel filter; and
   displaying a title of the selected channel filter within the status area.

13. An apparatus for providing an interactive user interface for a television display, the apparatus comprising a receiver for displaying a plurality of programme items in a first display area and a remote control for providing commands to the receiver, wherein the receiver is arranged to highlight a selectable one of the programme items, and simultaneously to display additional information relating to the highlighted said programme item in a second display area, the receiver being further arranged to receive a command from the remote control to cause scrolling of the display of programme items, and in response thereto, to automatically remove said display of additional information from the second display area and automatically expanding the display of programme items to include the second display area while scrolling the display of programme items, and automatically redisplaying said display of additional information in the second display area after scrolling of the display of programme items is stopped, wherein an outer extent of the first display area increases to include and overlap the second display area in response to the command, and wherein the second display area is located above the first display area.

14. The apparatus of claim 13, wherein the display of the plurality of programme items comprises a two-dimensional grid display.

15. The apparatus of claim 13, wherein the programme items comprise pre-recorded or video-on-demand items arranged in a grid, wherein a size of each of the plurality of programme items is a same size.

16. The apparatus of claim 13, wherein different ones of the programme items are selectable, and the selected programme is highlighted, in response to a directional command from the remote control.

17. The apparatus of claim 16, wherein the additional information changes to correspond to the highlighted programme.

18. The apparatus of claim 16, wherein the directional command is initiated by a swipe gesture on a touch pad of the remote control.

19. The apparatus of claim 13, wherein the command to cause scrolling is initiated by a swipe gesture on a touch pad of the remote control.

20. The apparatus of claim 13, wherein the additional information is displayed in the second display area after scrolling the display of programme items, relating to a highlighted one of the programme items.

21. The apparatus of claim 13, wherein the second display area has a fixed position at a top of the television display.

22. A non-transitory computer readable storage medium comprising program code arranged to perform the following method steps:

displaying a plurality of programme items in a first display area, wherein a selectable one of the programme items is highlighted, and simultaneously displaying additional information relating to the highlighted said programme item in a second display area;

receiving a command to cause scrolling of the display of programme items, and in response thereto, automatically removing said display of additional information from the second display area and automatically expanding the display of programme items to include the second display area while scrolling the display of programme items; and automatically redisplaying said display of additional information after the scrolling of the display of programme items is stopped, and wherein the second display area is discrete and does not overlap the first display area when the additional information is displayed, and wherein the second display area is located above the first display area.

23. A method of providing an interactive user interface for a television display, the method comprising:

displaying an electronic programme guide (EPG) comprising a plurality of programme items;

displaying a banner in response to selection of a programme item from the plurality of programme items, wherein the banner is displayed above the EPG, and wherein the banner displays additional information related to the selected programme item;

receiving a command to cause scrolling of the EPG, wherein the scrolling causes automatic removal of the banner during scrolling of the EPG, and automatically redisplaying the banner above the EPG after the scrolling of the EPG is stopped.

* * * * *